(12) United States Patent
Liang et al.

(10) Patent No.: US 12,164,184 B2
(45) Date of Patent: Dec. 10, 2024

(54) ELECTRO-OPTICAL DEVICE FABRICATED ON A SUBSTRATE

(71) Applicant: PSIQUANTUM CORP., Palo Alto, CA (US)

(72) Inventors: Yong Liang, Niskayanna, NY (US); Nikhil Kumar, Burlingame, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 182 days.

(21) Appl. No.: 17/723,295

(22) Filed: Apr. 18, 2022

(65) Prior Publication Data

US 2022/0244583 A1 Aug. 4, 2022

Related U.S. Application Data

(63) Continuation of application No. PCT/US2020/056365, filed on Oct. 19, 2020.
(Continued)

(51) Int. Cl.
*G02B 6/122* (2006.01)
*G02B 6/13* (2006.01)
(Continued)

(52) U.S. Cl.
CPC .............. *G02F 1/035* (2013.01); *G02B 6/122* (2013.01); *G02B 6/131* (2013.01); *G02F 1/0027* (2013.01); *G02F 1/05* (2013.01); *G02F 1/0508* (2013.01)

(58) Field of Classification Search
CPC ....... G02B 6/122; G02B 6/131; G02F 1/0027; G02F 1/035; G02F 1/05; G02F 1/0508
See application file for complete search history.

(56) References Cited

U.S. PATENT DOCUMENTS 7,039,264 B2   5/2006   Bryan et al.
7,718,231 B2 *  5/2010   Choe ................. H01L 21/26533
                                                      438/440
(Continued)

FOREIGN PATENT DOCUMENTS

WO     WO2006028477 A1    3/2006

OTHER PUBLICATIONS

Ortmann et al., "Optical and electro-optical phenomena in transition metal oxide thin film heterostructures", UT Electronic Theses and Dissertations, University of Texas at Austin, May 2019, 227 pgs. (Year: 2019).*

(Continued)

*Primary Examiner* — Ryan A Lepisto
(74) *Attorney, Agent, or Firm* — Morgan, Lewis & Bockius LLP

(57) ABSTRACT

An electro-optical device is fabricated on a semiconductor-on-insulator (SOI) substrate. The electro-optical device comprises a silicon dioxide layer, and an active layer having ferroelectric properties on the silicon dioxide layer. The silicon dioxide layer includes a first silicon dioxide layer of the SOI substrate and a second silicon dioxide layer converted from a silicon layer of the SOI substrate. The active layer includes a buffer layer epitaxially grown on the silicon layer of the SOI substrate and a ferroelectric layer epitaxially grown on the buffer layer. The electro-optical device further comprises one or more additional layers over the active layer, and first and second contacts to the active layer through at least one of the one or more additional layers. Methods of fabricating the electro-optical device are also described herein.

21 Claims, 13 Drawing Sheets

Related U.S. Application Data

(60) Provisional application No. 62/923,413, filed on Oct. 18, 2019.

(51) Int. Cl.
  G02F 1/00 (2006.01)
  G02F 1/035 (2006.01)
  G02F 1/05 (2006.01)

(56) References Cited

U.S. PATENT DOCUMENTS

| | | |
|---|---|---|
| 9,442,314 B2 | 9/2016 | Cunningham et al. |
| 11,009,727 B2 * | 5/2021 | Eltes .................. G02F 1/035 |
| 2004/0150043 A1 | 8/2004 | Holm et al. |

OTHER PUBLICATIONS

Cueff et al., "Hybrid Silicon-Ferroelectric Oxide Platform for Tunable Nanophotonics on Silicon", IEEE Xplore, 18th International Conference on Transparent Optical Networks, Jul. 2016, pp. 1-4.

PsiQuantum Corporation, ISRWO, PCT/US2020/056365, Feb. 26, 2021, 11 pgs.

PsiQuantum Corporation, IPRP, PCT/US2020/056365, Apr. 19, 2022, 8 pgs.

Pernice et al., "Design of a Silicon Integrated Electro-Optic Modulator Using Ferroelectric BaTiO3 Films", IEEE Photonics Technology Letters, vol. 26, No. 13, Jul. 2014, pp. 1344-1347.

Romeo et al., "Integration of Functional Oxides on SOI for Agile Silicon Photonics", IEEE Xplore, 17th International Conference on Transparent Optical Networks, Jul. 2015, pp. 1-5.

H. Li et al., "Dielectric properties of epitaxial Ba0.5Sr0.5TiO3Ba0.5Sr0.5TiO3 films on amorphous SiO2 on sapphire", Journal of Applied Physics, Special Topic: Thermal Transport 2D Materials, Appl. Phys. Lett. 87, 072905 (2005), Research Article, Aug. 9, 2005, 4 pgs.

D. McCready et al., "Thermal Lattice Expansion in Epitaxial SrTiO3(100) on Si(100)", JCPDS—International Centre for Diffraction Data 2006 ISSN 1097-002, Environmental Molecular Sciences Laboratory, Pacific Northwest National Laboratory, Richland, WA 99325 and Freescale Semiconductor, Inc., Tempe, AZ 85824, 6 pgs.

PsiQuantum Corporation, EP20876848.1, Extended European Search Report, Oct. 5, 2023, 9 pgs.

Ortmann et al., "Optical and electro-optical phenomena in transition metal oxide thin film heterostructures", UT Electronic Theses and Dissertations, University of Texas at Austin, May 2019, 227 pgs.

PsiQuantum Corporation, EP20876848.1, Communication Pursuant to Rules 70(2) and 70a(2) EPC (Supplementary European Search Report will be drawn up), Oct. 24, 2023, 1 pg.

* cited by examiner

ELECTRO-OPTICAL DEVICE FABRICATED ON A SUBSTRATE

CROSS REFERENCE TO RELATED APPLICATIONS

The present application is a continuation of PCT International Application PCT/US2020/056365, filed Oct. 19, 2020, which claimed priority under the Paris Convention to U.S. Provisional Patent Application No. 62/923,413, filed Oct. 18, 2019, entitled "Electro-Optical Device Fabricated on a Substrate and Comprising Ferroelectric Layer Epitaxially Grown on the Substrate," each of which is hereby incorporated by reference in its entirety.

TECHNICAL FIELD

The present application relates generally to electro-optical devices and, more specifically, to a thin-film electro-optical device fabricated on a silicon-on-insulator (SOI) substrate and comprising a ferroelectric layer epitaxial grown on the SOI substrate, and to methods of making such electro-optical devices.

BACKGROUND

An optical switch (e.g., integrated optical modulator) is a device that can modulate light beams propagating inside an optical waveguide by varying one or more fundamental characteristics of the light beams (e.g., amplitude, phase, polarization, etc.) through electro-absorption or electro-refraction. One of the primary electric field effects for causing either electro-absorption or electro-refraction is the linear electro-optical (Pockels) effect, where the refractive index of a medium is modified in proportion to the strength of an applied electric field. The Pockels effect occurs mainly in non-centrosymmetric materials or crystals that lack inversion symmetry, such as single crystal perovskite ferroelectric nanomaterials (e.g., $BaTiO_3$, $PbTiO_3$, $PbZrO_3$, $BiFeO_3$, etc.) grown on lattice matched MgO or $SrTiO_3$ substrates, among which barium titanate or BTO ($BaTiO_3$) is a particularly strong ferroelectric perovskite oxide with attractive dielectric and electro-optical properties. Therefore, integration of ferroelectric thin films (e.g., BTO) on silicon or silicon nitride based waveguide platforms will provide opportunities to develop low-cost and high quality electro-optic devices (e.g., optical switches).

SUMMARY

According to some embodiments, a method of fabricating an electro-optical device on a silicon-on-insulator (SOI) substrate comprises epitaxially growing an active layer having ferroelectric properties over the SOI substrate. The SOI substrate includes a silicon base substrate, a silicon dioxide layer on the silicon base substrate, and a silicon layer on the silicon dioxide layer. The method further comprises converting at least a first portion of the silicon in the silicon layer into another silicon dioxide layer adjoining the silicon dioxide layer of the SOI substrate, after at least part of the active layer is epitaxially grown on the SOI substrate. The method further comprises forming one or more additional layers over the active layer on the SOI substrate after at least the first portion of the silicon layer is converted into the second silicon dioxide layer. At least one of the one or more additional layers includes at least one non-ferroelectric material (e.g., silicon, silicon carbide, silicon germanium, silicon dioxide, silicon nitride, silicon oxynitride, silicon oxycarbide, aluminum oxide, magnesium oxide, etc.)

In some embodiments, the active layer includes a buffer layer and a ferroelectric layer, and epitaxially growing the active layer over the SOI substrate comprises: epitaxially growing the buffer layer (including, for example, Strontium Titanate and/or Magnesium Oxide) over the SOI substrate, and epitaxially growing the ferroelectric layer (including, for example, Barium Titanate, Barium Strontium Titanate, Lead Zirconate Titanate, Lanthanum-doped Lead Zirconium Titanate, Lithium Niobate, Lithium Tantalate, and/or Strontium Barium Niobate) over the buffer layer. In some embodiments, the ferroelectric layer includes a superlattice of multiple interleaved layers of different ferroelectric materials (e.g., Barium Titanate, Barium Strontium Titanate, Lead Zirconate Titanate, Lanthanum-doped Lead Zirconium Titanate, Lithium Niobate, Lithium Tantalate, and/or Strontium Barium Niobate), or multiple interleaved layers of one or more of the ferroelectric materials and one or more non-ferroelectric materials (e.g., Strontium Titanate and/or Magnesium Oxide). In some embodiments, at least a first portion of the buffer layer is epitaxially grown on at least the first portion of the silicon layer. In some embodiments, the first portion of the silicon layer is converted to the second silicon dioxide layer after the buffer layer is epitaxially grown over the SOI substrate and before the ferroelectric layer is epitaxially grown over the buffer layer. In some embodiments, the first portion of the silicon layer is converted to the second silicon dioxide layer after a lower portion of the ferroelectric layer is epitaxially grown over the buffer layer and before an upper portion of the ferroelectric layer is epitaxially grown over the lower portion of the ferroelectric layer. In some embodiments, the first portion of the silicon layer is converted to the second silicon dioxide layer by subjecting the SOI substrate with the active layer at least partially formed thereon to an oxidation anneal process.

In some embodiments, forming the one or more additional layers comprises forming a waveguide over the active layer, and forming a cladding layer over the waveguide. In some embodiments, the cladding layer includes a dielectric material selected from the group consisting of: silicon dioxide, silicon nitride, silicon oxynitride, silicon oxycarbide, aluminum oxide, and magnesium oxide. The waveguide includes a material (e.g., Si, SiN, MgO, SiC, etched BTO or a ferroelectric material different from the ferroelectric material in the active layer, etc.) having an index of refraction greater than that of the cladding layer. In some embodiments, forming the one or more additional layers further comprises, before forming the waveguide, forming a dielectric buffer layer over the active layer. Thus, the waveguide is formed over the dielectric buffer layer.

In some embodiments, the method further comprises, after forming the active layer and before forming the one or more additional layers: etching an upper portion of the ferroelectric layer to form a ferroelectric waveguide over a lower portion of the ferroelectric layer. In some embodiments, the one or more additional layers includes a cladding layer of a dielectric material formed over the waveguide, the dielectric material being selected from the group consisting of: silicon dioxide, silicon nitride, silicon oxynitride, silicon oxycarbide, aluminum oxide, and magnesium oxide.

In some embodiments, instead of, or in addition to, forming a waveguide and cladding over the active layer, the method further comprises, before epitaxially growing the active layer: forming a silicon ridge on a second portion of the silicon layer. In some embodiments, a second portion of the active layer is epitaxially grown over the silicon ridge, and an outer portion of the silicon ridge adjacent to the active layer is converted into a third silicon dioxide layer concurrently with converting the first portion of the silicon layer into the second silicon dioxide layer. As a result, an inner portion of the silicon ridge under the third silicon dioxide layer forms a silicon ridge waveguide and is separated from the active layer by the third silicon dioxide layer.

In some embodiments, forming the one or more additional layers comprises: etching a trench in the active layer, depositing a layer of waveguide material (e.g., silicon, silicon-rich silicon germanium, germanium, silicon carbide, or a ferroelectric material different from the ferroelectric material in the active layer) over the active layer filling the trench, removing a portion of the layer of waveguide material outside the trench to form a waveguide in the trench, and forming a cladding layer (e.g., a dielectric cladding including one or more of silicon dioxide, silicon nitride, silicon oxynitride, silicon oxycarbide, aluminum oxide, and magnesium oxide) over the waveguide and the active layer. The waveguide material should have an index of refraction greater than that of the cladding layer.

In some embodiments, forming the one or more additional layers comprises: forming a waveguide over the active layer, forming a first dielectric layer over the waveguide and the active layer, planarizing the first dielectric layer, replacing portions of the first dielectric layer occupying first and second areas in the first dielectric layer with doped polysilicon, the first and second areas being on opposite sides of the waveguide, and forming a second dielectric layer over the waveguide, the doped polysilicon and the first dielectric layer. In some embodiments, the first and second areas are on opposite sides of the waveguide, proximate to where the first and second contacts, respectively, are to be formed. In some embodiments, the first contact is coupled to a first portion of the doped polysilicon in the first area and the second contact is coupled to a second portion of the doped polysilicon in the second area. In some embodiments, the first portion of the doped polysilicon is disposed between the first contact and the waveguide, and the second portion of the doped polysilicon is disposed between the second contact and the waveguide. In some embodiments, the first and second contacts are formed through the first dielectric layer and at least partially through the second dielectric layer.

Thus, the method of fabricating an electro-optical device according to some embodiments provides seamless integration of the formation of a complex oxide film and other components of the electro-optical device on a semiconductor platform.

According to some embodiments, an electro-optical device is fabricated on a SOI substrate and comprises a silicon dioxide layer on the silicon base substrate of the SOI substrate, and an epitaxially grown active layer having ferroelectric properties over the silicon dioxide layer. The silicon dioxide layer includes a first silicon dioxide layer that is part of the SOI substrate and a second silicon dioxide layer adjoining the first silicon dioxide layer and adjacent to the active layer. The first silicon dioxide layer and the second silicon dioxide layer form a contiguous silicon dioxide layer adjacent at least a portion of the active layer. The second silicon dioxide layer is converted from at least a portion of the silicon layer of the SOI substrate. The active layer includes a buffer layer at least partially adjacent to the silicon dioxide layer and a ferroelectric layer epitaxially grown on the buffer layer and separated from the silicon dioxide layer by at least the buffer layer. The electro-optical device further comprises one or more additional layers over the active layer, and first and second contacts to the active layer through at least one of the one or more additional layers. At least one of the one or more additional layers includes a non-ferroelectric material (e.g., silicon, silicon carbide, silicon germanium, silicon dioxide, silicon nitride, silicon oxynitride, silicon oxycarbide, aluminum oxide, magnesium oxide, etc.) In some embodiments, the contacts may further extend partially or entirely through the active layer.

In some embodiments, the buffer layer includes one or more of, for example, Strontium Titanate and/or Magnesium Oxide, and the ferroelectric layer includes one or more of, for example, Barium Titanate, Barium Strontium Titanate, Lead Zirconate Titanate, Lanthanum-doped Lead Zirconium Titanate, Lithium Niobate, Lithium Tantalate, and/or Strontium Barium Niobate. In some embodiments, the buffer layer has a thickness in the range of 3 nm to 30 nm, and the ferroelectric layer has a thickness in the range of 50 nm to 750 nm. The ferroelectric layer may be a superlattice layer including multiple interleaved layers of different ferroelectric materials, or multiple interleaved layers of one or more ferroelectric materials and one or more non-ferroelectric materials.

In some embodiments, the one or more additional layers includes a waveguide disposed over the active layer, and a cladding for the waveguide. The one or more additional layers may further include a dielectric layer between the waveguide and the active layer. In some embodiments, the cladding includes a dielectric material selected from the group consisting of: silicon dioxide, silicon nitride, silicon oxynitride, silicon oxycarbide, aluminum oxide, and magnesium oxide. The waveguide includes a material (e.g., Si, SiN, MgO, SiC, etched BTO or another ferroelectric material, etc.) having an index of refraction greater than that of the cladding layer.

In some embodiments, the active layer includes a ferroelectric waveguide over and adjoining a lower portion of the ferroelectric layer, and the one or more additional layers include a cladding for the ferroelectric waveguide.

In some embodiments, the electro-optical device further includes a silicon ridge waveguide between the active layer and the silicon dioxide layer. In some embodiments, the silicon ridge waveguide is separate from the active layer by a third oxide layer having the same or approximately the same thickness as the second silicon dioxide layer. In some embodiments, the active layer has an uneven top surface adjacent one of the one or more additional layers.

In some embodiments, the active layer has a trench, and the one or more additional layers include a waveguide formed in the trench. In some embodiments, the waveguide includes one or more of silicon, silicon-rich silicon germanium, germanium, or silicon carbide, and the one or more additional layers further include a layer of a dielectric material over the waveguide and the active layer, the dielectric material being selected from the group consisting of: silicon dioxide, silicon nitride, silicon oxynitride, silicon oxycarbide, aluminum oxide, and magnesium oxide.

In some embodiments, the one or more additional layers include: a waveguide over the active layer, a dielectric layer over the waveguide and the active layer, and first and second doped polysilicon regions on opposite sides of the waveguide and separated from the waveguide by portions of the dielectric layer. In some embodiments, the first contact is coupled to the first doped polysilicon region, and the second contact is coupled to the second doped polysilicon region. In some embodiments, the first doped polysilicon region is disposed on the active layer and between the first contact and the waveguide, and the second doped polysilicon region is disposed on the active layer and between the second contact and the waveguide. In some embodiments, the first and second contacts are formed at least partially through the dielectric layer. In some embodiments, the waveguide includes silicon nitride, and the dielectric layer includes silicon dioxide.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Like reference numerals refer to corresponding parts throughout the several views of the drawings. For ease of illustration, the drawings may not be drawn to scale unless stated otherwise.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first dielectric layer could be termed a second dielectric layer, and, similarly, a second dielectric layer could be termed a first dielectric layer, without departing from the scope of the various described embodiments. The first dielectric layer and the second dielectric layer are both dielectric layers, but they are not the same dielectric layer.

Figure 1A:
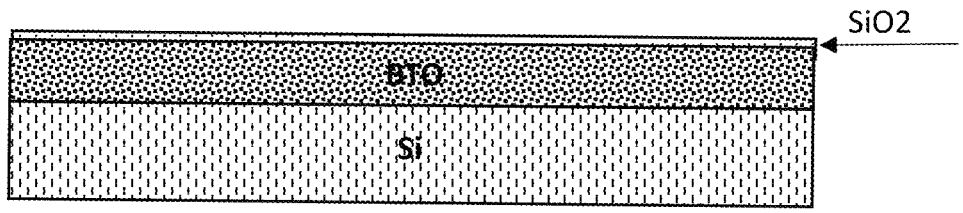
FIGS. 1A-1C are cross-sectional diagrams illustrating a prior art method of integrating a ferroelectric layer into an electro-optical device using semiconductor processing technologies.
Figure 1B:
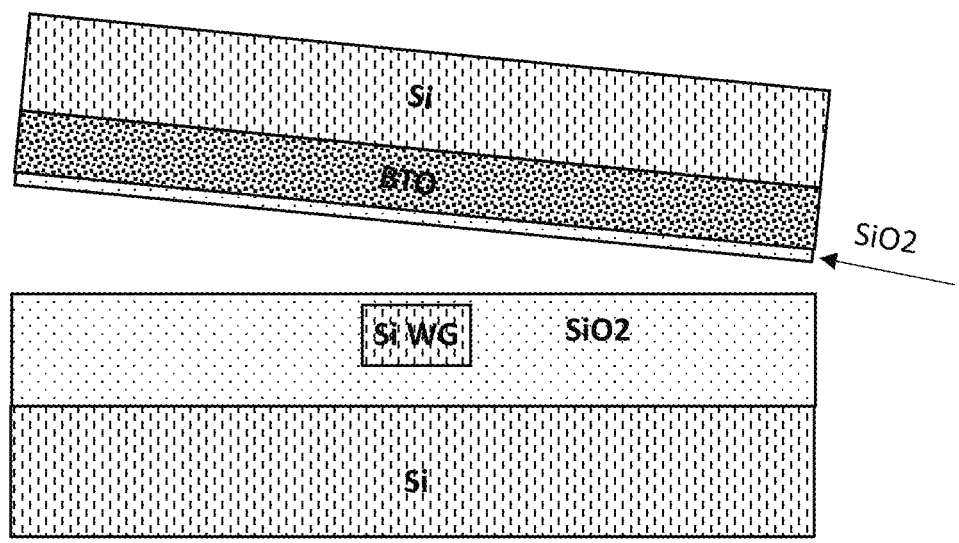
Figure 1C:
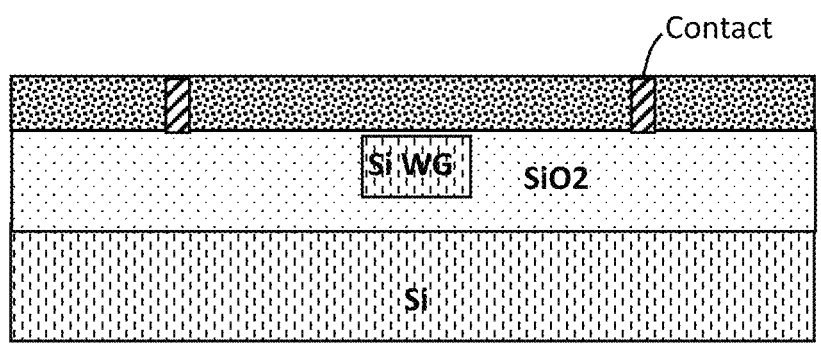

Recent technology advancements have demonstrated successful growth of ferroelectric thin films on planar Si substrates using complex molecular beam epitaxy (MBE) techniques, which makes it possible for monolithic integration of various complex oxides in electro-optical devices using semiconductor processing technologies. BaTiO3 or BTO is considered the material of choice for next generation electro-optical switches due to its high Pockels coefficient, high band width, and low dielectric loss. FIGS. 1A-1C illustrates a common conventional approach for fabricating an electro-optical switch including BTO. As shown in FIG. 1A, a blanket BTO thin film can be epitaxially grown on a silicon substrate using $SrTiO_3$ as a buffer. A silicon dioxide ($SiO_2$) bonding layer is then overlaid on the BTO thin film. As shown in FIG. 1B, on another silicon wafer, a silicon waveguide is formed and is surrounded by a silicon dioxide cladding layer having a flat top surface, which can be obtained by, for example, chemical mechanical polishing after blanket deposition of the silicon dioxide layer over the silicon waveguide. The first wafer with the blanket BTO film formed thereon is then flipped over and bonded to the second wafer through wafer-to-wafer bonding, so that the blanket BTO film is transferred to the flat top surface of the silicon dioxide cladding on the second wafer. As shown in FIG. 1C, the first wafer is subsequently removed (e.g., by grinding and/or chemical mechanical polishing), and electrodes or contacts are then formed in the BTO film to allow application of an electric field across the contacts. This conventional process involves transferring of the BTO film from one substrate to another, and is thus inefficient, costly, and limiting on the underlying device architecture.

According to some embodiments, a method of fabricating an electro-optical device comprises epitaxially growing an active layer with ferroelectric properties on a semiconductor-on-insulator (SOI) substrate and forming other parts of the electro-optical device on the same SOI substrate. The method eliminates the need for wafer-to-wafer bonding or transferring of a ferroelectric film from one substrate to another. It also allows three-dimensional architecture for the electro-optical device, and simplifies fabrication processes and device integration.

Figure 2A:
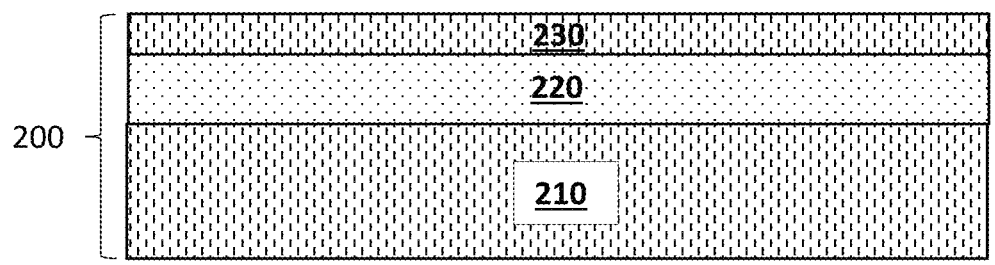
FIGS. 2A-2C are cross-sectional diagrams illustrating formation of an initial structure for an electro-optical device including an active layer having ferroelectric properties on a contiguous amorphous silicon dioxide film according to some embodiments.

As shown in FIG. 2A, the SOI substrate 200 includes a semiconductor (e.g., silicon or Si) base 210, an oxide layer 220 (e.g., silicon dioxide or $SiO_2$) on the semiconductor base substrate 210, and a semiconductor layer 230 (e.g., silicon) on the oxide layer 220. Although silicon-based SOI substrate having a silicon layer 230 on a silicon dioxide layer 220 on a silicon base substrate 210 is used herein as an example of the SOI substrate, the SOI substrate can be based on other types of semiconductors (e.g., germanium or gallium arsenide). The thickness of the silicon layer 230 and the $SiO_2$ layer 220 on the SOI substrate can vary according to application. In some embodiments, the thickness of the silicon layer 230 on the SOI substrate is equal to or less than 150 nm, the thickness of the $SiO_2$ layer 220 can range from 0.5 to 4 μm, and the thickness of the silicon base 210 can range from 100 μm to 2 mm.

Figure 2B:
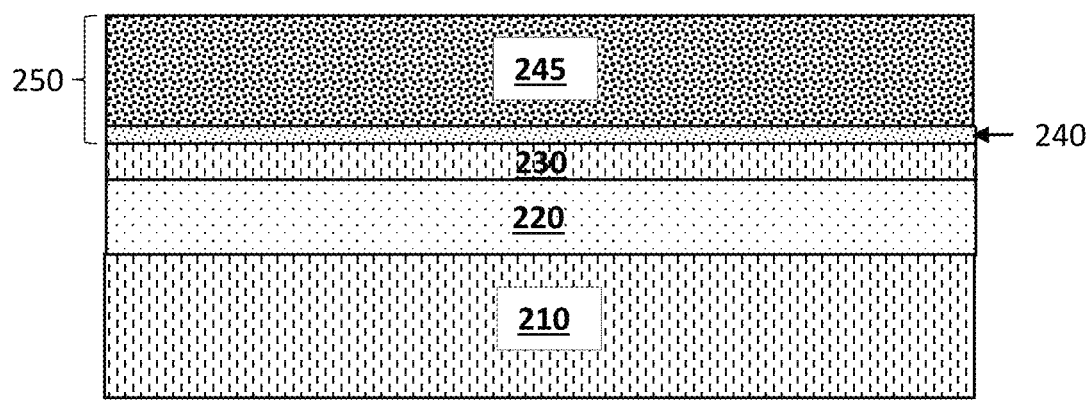

In some embodiments, as shown in FIG. 2B, the method comprises epitaxially growing an active layer 250 having ferroelectric properties on the SOI substrate. The active layer 250 can include, for example, an optional buffer layer 240 and a ferroelectric layer 245. Thus, epitaxially growing the active layer on the SOI substrate can include epitaxially growing the buffer layer 240 on the silicon layer 230 on the SOI substrate, and epitaxially growing the ferroelectric layer 245 on the buffer layer 240. In some embodiments, the buffer layer 240 includes, for example, any one or more of Strontium Titanate or STO (SrTiO3) and/or Magnesium Oxide (MO$_3$), although Strontium Titanate is used herein as an example when describing some embodiments. The ferroelectric layer 245 can include, for example, any one or more of Barium Titanate or BTO (BaTiO$_3$), Barium Strontium Titanate or BST (BaSrTiO$_3$), Lead Zirconate Titanate (Pb[Zr$_x$Ti$_{1-x}$]O$_3$), Lanthanum-doped Lead Zirconium Titanate (Pb$_y$La$_{1-y}$[Zr$_x$Ti$_{1-x}$]$_z$O$_3$), and Strontium-Barium Niobate (Sr$_x$Ba$_{1-x}$Nb$_2$O$_6$) (e.g., PLZT 17/30/70, Pb$_{0.83}$La$_{0.17}$[Zr$_{0.3}$Ti$_{0.7}$]$_{0.9575}$O$_3$), although BTO is used herein as an example when describing some embodiments. The ferroelectric layer can also include a superlattice of multiple interleaved layers of different ferroelectric materials (e.g., Barium Titanate, Barium Strontium Titanate, Lead Zirconate Titanate, Lanthanum-doped Lead Zirconium Titanate, Lithium Niobate, Lithium Tantalate, and/or Strontium Barium Niobate), or multiple interleaved layers of one or more of the ferroelectric materials and one or more non-ferroelectric materials (e.g., Strontium Titanate and/or Magnesium Oxide).

In some embodiments, epitaxially growing the active layer 250 includes obtaining an SOI substrate having a clean silicon surface (e.g., Si [001] 2×1 reconstructed surface), and passivating the silicon surface using conventional techniques. After the silicon surface is passivated, a SrTiO$_3$ buffer layer 240 can be epitaxially grown on the silicon layer. A thin film (~3 nm to 30 nm) epitaxially grown SrTiO3 layer is grown initially as a buffer layer to promote the epitaxial growth of the subsequently deposited BaTiO3 layer. In some embodiments, the first few MLs (1-3 ML) of SrTiO$_3$ can be grown at a lower temperature (e.g., 100-300° C.) under, for example, an oxygen pressure of $10^{-8}$-$1.5\times10^{-6}$ Torr, in order to avoid oxidation at the silicon surface. These few MLs of SrTiO$_3$ is mostly amorphous so an annealing process at higher temperature (e.g., 500-750° C.) in ultra-high vacuum conditions (e.g., pressure <$5\times10^{-9}$ Torr) is performed to crystallize the SrTiO$_3$ grown on the silicon surface. More SrTiO$_3$ is then grown at higher temperature (e.g., 500-600° C.), or at lower temperature (e.g., 300-500° C.) followed by annealing at higher temperature (e.g., 550-750° C.) until a desired thickness of the SrTiO$_3$ buffer layer is achieved.

The ferroelectric layer 245 can be epitaxially grown on the buffer layer at higher temperatures (e.g., 500-800° C.), or using similar lower temperature deposition and higher temperature annealing techniques. For example, an amorphous BTO film is first deposited on the buffer layer at lower temperature (e.g., 100-300° C.). Then, the SOI substrate with the buffer layer 240 and the BTO amorphous film formed thereon is subjected to a high temperature annealing process at, for example, 600° C.-750° C. for a period of time (e.g., 20 minutes), in an annealing furnace. Epitaxial BTO layer can also be epitaxially grown on the buffer layer 240 at higher temperatures of 500-800° C. without subsequent annealing. The ramping rates for heating and cooling of the SOI substrate in the annealing furnace can be, for example, 100° C./min and −50° C./min respectively. The process cycle (deposition at lower temperature (e.g., 100-300° C.) and subsequent annealing at higher (e.g., 500-750° C.) can be repeated several times to obtain an oriented thin film 245 with thickness of 50 nm to 750 nm.

In some embodiments, the buffer layer 240 is used to facilitate epitaxial growth of c-axis oriented BaTiO$_3$ films on silicon. The lattice mismatch between BaTiO$_3$ and Si (001) is about 4%, which is relatively large. Also, there is a significant mismatch of the thermal expansion coefficients α between Si ($\alpha$=2.6×10$^{-6}$K$^{-1}$) and BaTiO$_3$ ($\alpha$=9×10$^{-6}$ K$^{-1}$), which can lead to in-plane biaxial tensile strain exerted on the BaTiO$_3$ film upon cooling. These factors tend to favor a-axis growth when BaTiO$_3$ is directly grown on Si. To mitigate these mismatches, a thin (e.g., 3 nm to 30 nm thick) buffer layer 240 of, for example, SrTiO$_3$ (STO), is first grown on the Si surface. Subsequently, a thicker (e.g., 50 nm to 750 nm thick) layer of BTO is grown on the STO buffer layer. In some embodiments, the buffer layer 240 is used to exert certain biaxial compressive in-plane strain, which helps to overcome the biaxial tensile in-plane strain on the BaTiO$_3$ film during cooling to room temperature after the active layer is formed, resulting in higher quality BTO layer 245. In some embodiments, to further ease the strain caused the aforementioned mismatches, a superlattice of interleaved BTO (and/or BST) and STO layers are grown as the ferroelectric layer 245 using similar techniques.

Figure 2C:
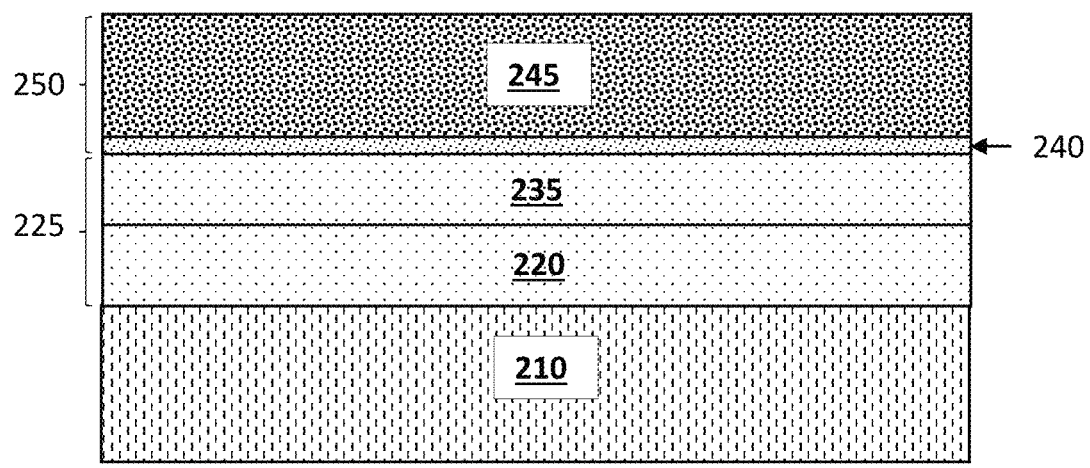

In some embodiments, as shown in FIG. 2C, the method further comprises converting the silicon layer 230 into another silicon dioxide layer 235 adjoining the silicon dioxide layer 220 of the SOI substrate after at least part of the active layer is epitaxially grown on the SOI substrate. The silicon at or near the silicon surface can be oxidized as a side-effect of epitaxially growing the active layer, which, as discussed above, can include one or more annealing processes. In some embodiments, in addition to the annealing processes used to grow the active layer, an additional oxidation anneal process is used to convert an entire thickness of the silicon layer into an oxide layer. The converted oxide layer joins the silicon dioxide layer of the SOI substrate to form a contiguous oxide layer 225 under the active layer that is thicker (e.g., up to 350 nm thicker) than the original silicon dioxide layer of the SOI substrate. Thus, after the epitaxial growth of the active layer and conversion of the silicon layer into silicon dioxide, the resulting structure includes the single crystal active layer 250 on a thick (e.g., 0.8 to 4.3 μm) amorphous silicon dioxide layer 225, as shown in FIG. 2C. Note that the dashed line in FIG. 2C is only used to delineate the former intersection between the silicon layer and the silicon dioxide layer of the SOI substrate. In some embodiments, the oxidation anneal process can be performed after the buffer layer 240 is formed and before the ferroelectric layer 245 is grown. In some embodiments, the oxidation anneal process can be performed after a lower portion of the ferroelectric layer 245 is grown, or after the entire ferroelectric layer is grown (e.g., post-BTO anneal). For example, the SOI/STO/BTO stack shown in FIG. 2B can be subjected to a post growth annealing process in flowing oxygen at temperatures ranging from 800-1000° C. for an extended period of time (e.g., >2 hours) to fully convert the Si layer on the SOI substrate to SiO$_2$. The amount of time required for the annealing process depends on the thicknesses of the active layer and the silicon layer. For example, for a stack with a silicon layer thicker than a few tens of nanometers, the amount of time needed to convert the entire thickness of the silicon layer 230 can be more than an hour. An optional dielectric buffer layer (not shown) can formed on the active layer as a protective layer during the oxidation anneal process and as an etch stop layer in subsequent processes to form one or more additional layers on the active layer. In some embodiments, post-BTO anneal improves the quality of the grown active layer while converting the silicon layer into $SiO_2$.

In some embodiments, as shown in FIGS. 3A to 6C, the method further comprises forming one or more additional patterned and/or blanket layers over the active layer on the SOI substrate after the silicon layer is converted into the second silicon dioxide layer. At least one of the one or more additional layers includes a non-ferroelectric material (e.g., silicon, silicon carbide, silicon germanium, silicon dioxide, silicon nitride, silicon oxynitride, silicon oxycarbide, aluminum oxide, magnesium oxide, etc.).

Figure 3A:
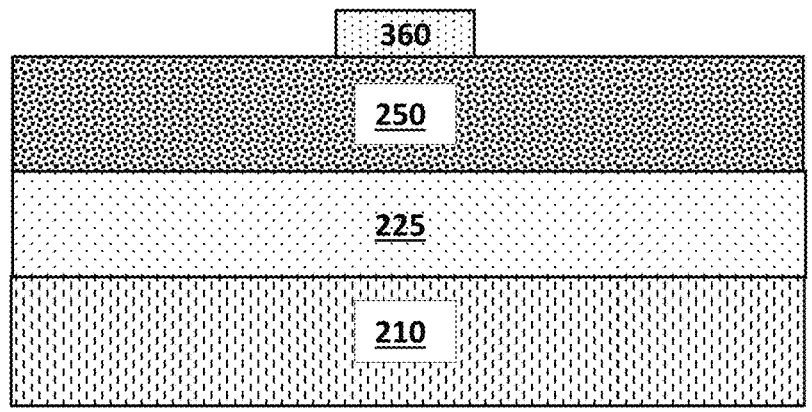
FIGS. 3A-3C, 4A-4C, 5A-5C, and 6A-6C are cross-sectional diagrams illustrating formation of one or more additional layers over the active layer according to various embodiments.
Figure 3B:
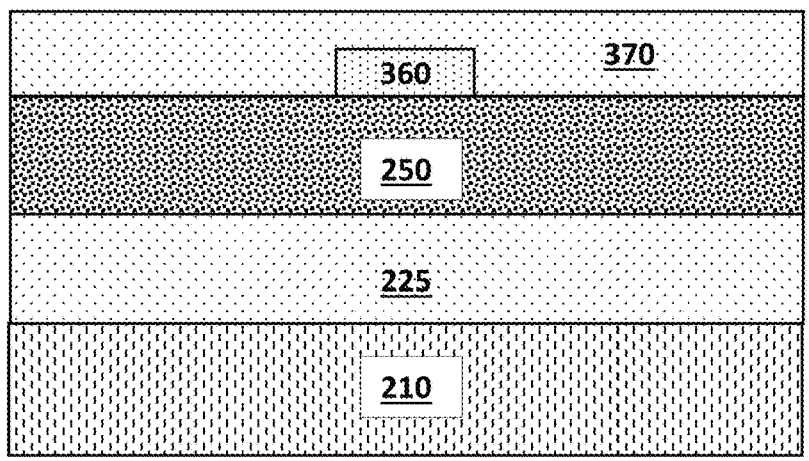
Figure 3C:
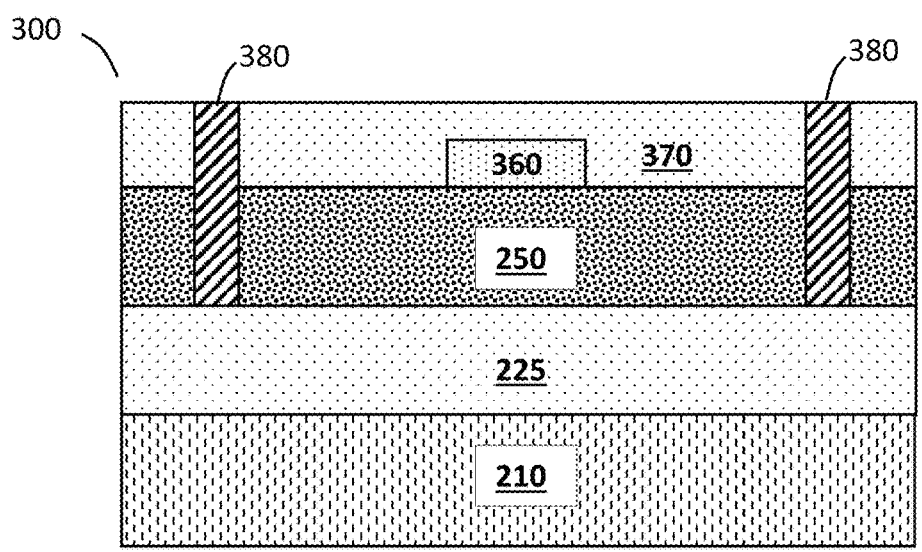

FIGS. 3A-3C are cross-sectional diagrams illustrating formation of the one or more additional layers during fabrication of an electro-optical device 300 according to some embodiments. In some embodiments, as shown in FIG. 3A, forming the one or more additional layers comprises forming a waveguide 360 (e.g., silicon nitride waveguide) over the active layer 250, and forming a cladding layer 370 (e.g., silicon dioxide cladding) over the waveguide 360, as shown in FIG. 3B. The waveguide 360 can be formed by, for example, blanket deposition of a waveguide material (e.g., silicon nitride) on the active layer 250, forming a mask over the blanket waveguide material covering the area where the waveguide is to be situated, and etching the waveguide material using, for example, anisotropic reactive ion etching (ME), to remove the unmasked waveguide material. The cladding layer 370 can be formed by, for example, blanket deposition of a cladding material (e.g., silicon dioxide) over the waveguide and the active layer 250, and planarizing a top surface of the layer of cladding material using, for example, chemical mechanical polishing (CMP). The waveguide 360 should have an index of refraction greater than that of the cladding layer. In some embodiments, the waveguide 360 can include, for example, one or more of silicon, silicon nitride, silicon carbide, silicon germanium, germanium, gallium arsenide, etched BTO or another ferroelectric material, etc., and the cladding layer can include, for example, one or more of silicon, silicon dioxide, silicon nitride, silicon oxynitride, silicon oxycarbide, aluminum oxide, and magnesium oxide. In some embodiments, forming the one or more additional layers further comprises, before forming the waveguide 360, forming a dielectric buffer layer (e.g., silicon dioxide) over the active layer 250. Thus, the waveguide 360 is formed over the dielectric buffer layer.

In some embodiments, the method further comprises forming at least first and second contacts 380 to the active layer 250 through at least one of the one or more additional layers (e.g., the cladding layer), as shown in FIG. 3C. In some embodiments, the first and second contacts 380 are on opposite sides of the waveguide and separated from the waveguide by at least portions of the cladding layer. In some embodiments, the first and second contacts 380 abuts a top surface of the active layer 250. In some embodiments, the first and second contacts 380 are partially through or all the way through the active layer 250. In some embodiments, the first and second contacts 380 include a metal (e.g., copper, gold, etc.) and facilitate application of an electric field across a portion of the active layer 250 between the first and second contacts 380.

Figure 4A:
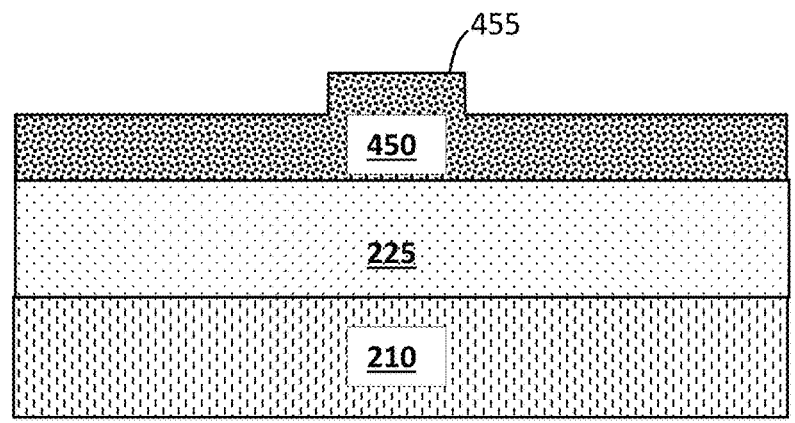
Figure 4B:
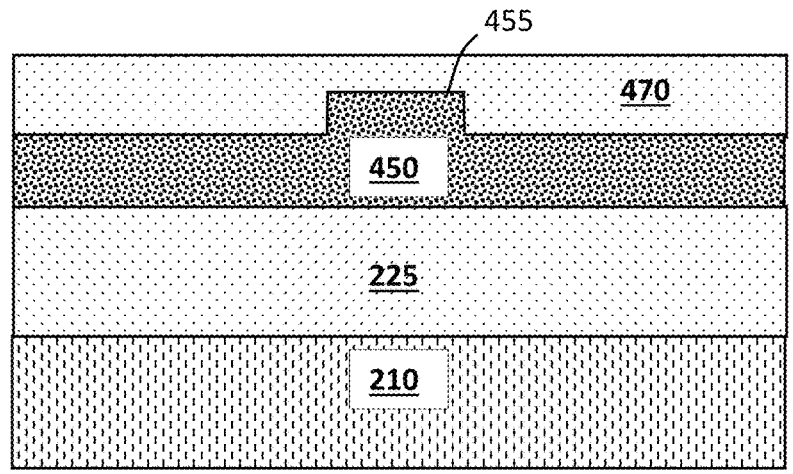
Figure 4C:
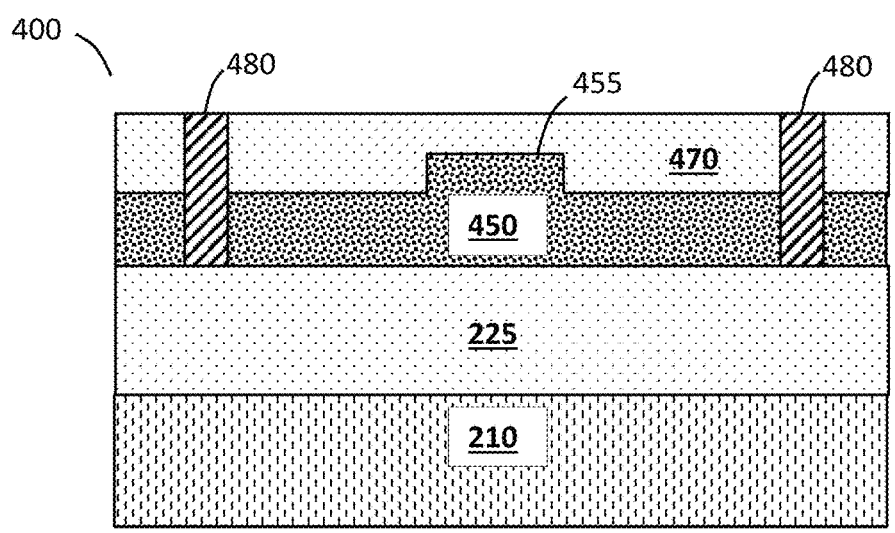

FIGS. 4A-4C are cross-sectional diagrams illustrating formation of the one or more additional layers during fabrication of an electro-optical device 400 according to some embodiments. In some embodiments, as shown in FIG. 4A, the method further comprises, after forming the active layer 250 and before forming the one or more additional layers: etching an upper portion of the ferroelectric layer 245 to form a ferroelectric ridge waveguide 455 over a lower portion 450 of the active layer 250. In some embodiments, as shown in FIG. 4B, the one or more additional layers includes a cladding layer 470 of a dielectric material formed over the waveguide 455. The dielectric material includes one or more of: silicon dioxide, silicon nitride, silicon oxynitride, silicon oxycarbide, aluminum oxide, and magnesium oxide. The cladding layer 470 shown in FIG. 4B can be formed similarly as the cladding layer shown in FIG. 3B is formed (e.g., by blanket deposition followed by patterned etching).

In some embodiments, as shown in FIG. 4C, first and second contacts 480 are then formed on opposite sides of the waveguide and separated from the waveguide by at least portions of the cladding layer 470. In some embodiments, the first and second contacts 480 abuts a top surface of the active layer 250. In some embodiments, the first and second contacts 480 are at least partially through the active layer 250. In some embodiments, the first and second contacts 480 include a metal (e.g., copper, gold, etc.) and facilitate application of an electric field across a portion of the active layer 250 between the first and second contacts 480.

Figure 5A:
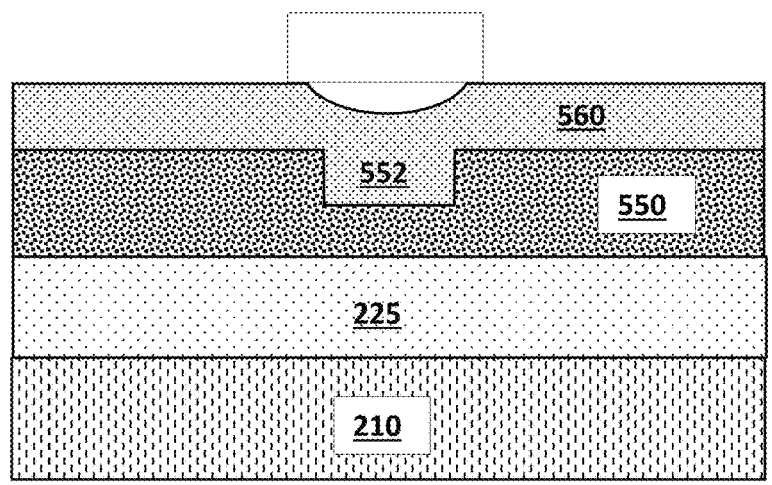
Figure 5B:
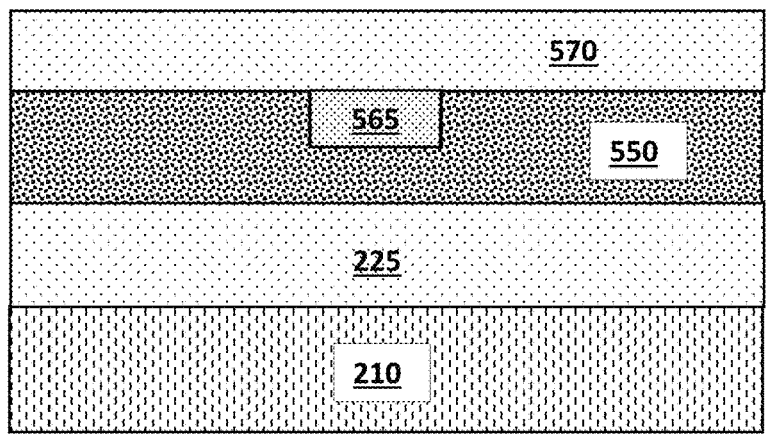
Figure 5C:
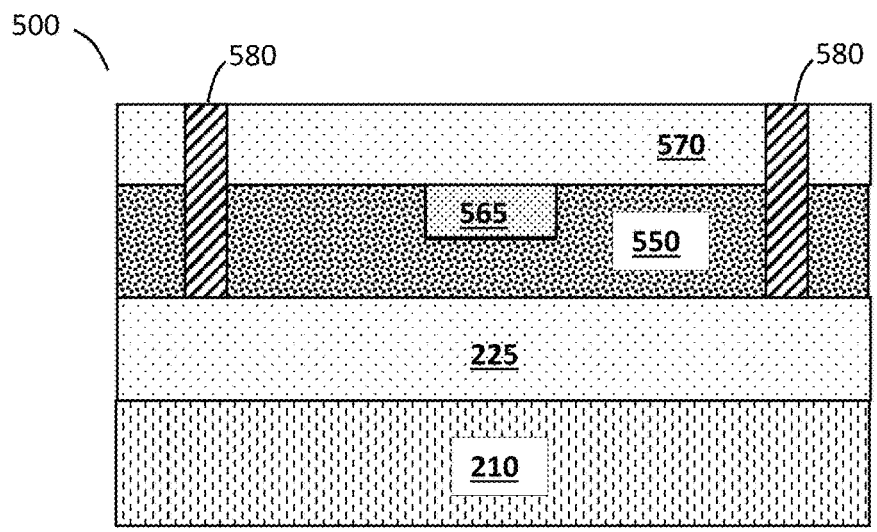

FIGS. 5A-5C are cross-sectional diagrams illustrating formation of the one or more additional layers during fabrication of an electro-optical device 500 according to some embodiments. In some embodiments, as shown in FIG. 5A, forming the one or more additional layers comprises etching a trench 552 in the active layer 250 to form a patterned active layer 550 and depositing a layer of waveguide material 560 (e.g., silicon, silicon-rich silicon germanium, germanium, silicon carbide, magnesium oxide, a ferroelectric material different from the ferroelectric material in the active layer 250, etc.) over the active layer 550 and filling the trench 552. In some embodiments, as shown in FIG. 5B, forming the one or more additional layers further comprises removing a portion of the layer of waveguide material 560 outside the trench using, for example, CMP, to form a waveguide 565 in the trench, and forming a cladding layer 570 (e.g., a dielectric cladding including one or more of silicon dioxide, silicon nitride, silicon oxynitride, silicon oxycarbide, aluminum oxide, magnesium oxide, etc., having an index of refraction lower than that of the waveguide) over the waveguide 565 and the active layer 550.

In some embodiments, as shown in FIG. 5C, first and second contacts 580 are then formed on opposite sides of the waveguide and separated from the waveguide by at least portions of the cladding layer. In some embodiments, the first and second contacts 580 abuts a top surface of the active layer 550. In some embodiments, the first and second contacts 580 are at least partially through the active layer 550. In some embodiments, the first and second contacts 580 include a metal (e.g., copper, gold, etc.) and facilitate application of an electric field across a portion of the active layer 550 between the first and second contacts 580.

Figure 6A:
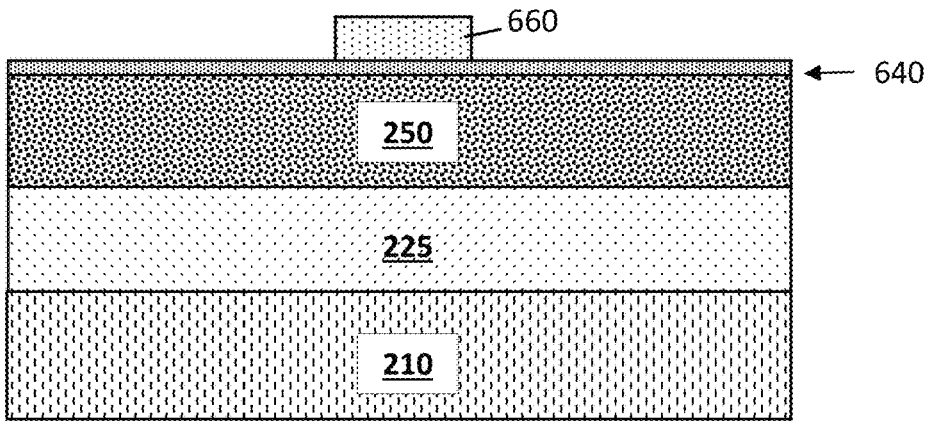
Figure 6B:
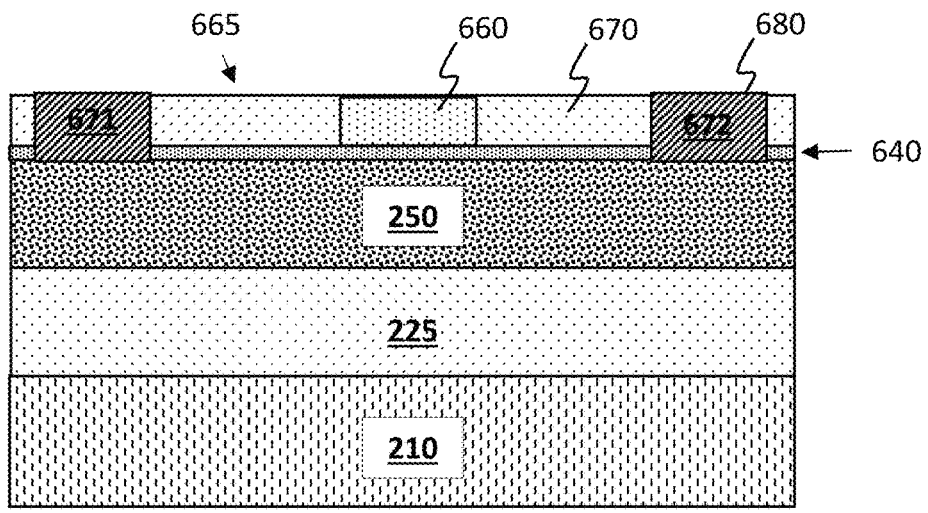
Figure 6C:
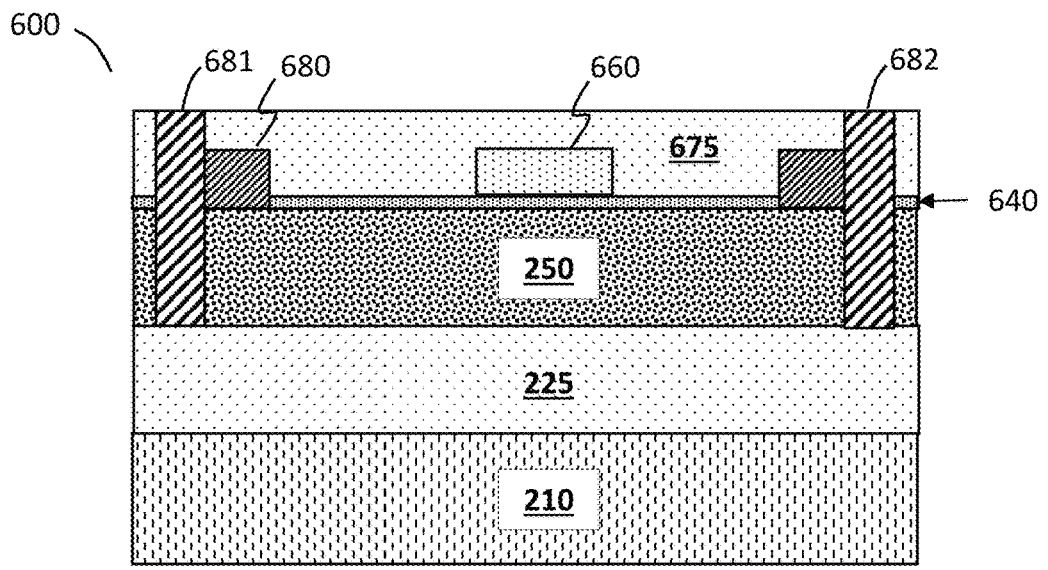

FIGS. 6A-6C are cross-sectional diagrams illustrating formation of the one or more additional layers during fabrication of an electro-optical device 600 according to some embodiments. In some embodiments, as shown in FIG. 6A, forming the one or more additional layers comprises forming a waveguide 660 over the active layer 250, similarly as the waveguide in FIG. 3A is formed. An optional dielectric buffer 640 can be deposited on the active layer 250 before the waveguide 660 is formed. The buffer layer 640 can act as a protective layer during the oxidation anneal process and as an etch stop layer in an etching process to form the waveguide 660. Thus, the waveguide 660 can be separated from the active layer 250 by the dielectric buffer layer 640. Subsequently, as shown in FIG. 6B, a dielectric material (e.g., silicon dioxide) is deposited over the waveguide and the active layer 250, and is planarizing (e.g., by CMP) to form a first dielectric layer 670. In some embodiments, the first dielectric layer 670 is about as thick as the waveguide 660 so a top surface 665 of the resulting structure is substantially planar (e.g., a difference between a first thickness of the first dielectric layer and a second thickness of the waveguide is less than 10% or 5% of either the first thickness or the second thickness or an average of both).

In some embodiments, as shown in FIG. 6B, forming the one or more additional layers further comprises removing portions of the first dielectric layer 670 and the underlying portions of the dielectric buffer layer 640 to create first and second voids 671/672 (e.g., holes, trenches or cavities) on opposite sides of the waveguide using, for example, a patterned RIE process. In some embodiments, forming the one or more additional layers further comprises filling the first and second voids 671/672 with doped polysilicon 680, which can be done by, for example, blanket deposition of the doped polysilicon and selective removal of the polysilicon outside of the first and second voids 671/672 using, for example, CMP. In some embodiments, forming the one or more additional layers further comprises depositing a dielectric material (e.g., silicon dioxide) over the waveguide 660, the doped polysilicon 680 in the first and second voids, and the first dielectric layer 670, resulting in a thicker cladding layer 675 that includes the first dielectric layer 670 and newly deposited dielectric material.

In some embodiments, as shown in FIG. 6C, first and second contacts 681/682 are then formed on opposite sides of the waveguide 660 and separated from the waveguide 660 by respective portions of the cladding layer 675. In some embodiments, the first and second voids are proximate to where the first and second contacts 681/682, respectively, are to be formed. In some embodiments, as shown in FIG. 6C, the first and second contacts 681/682 are coupled, respectively, to the doped polysilicon 680 filling the first and second voids 671/672. In some embodiments, the first and second contacts 681/682 are formed through the first dielectric layer 670 and abut the doped polysilicon 680 filling the first and second voids 671/672, respectively. In some embodiments, the first contact 681 is formed through the first dielectric layer and at least partially through the doped polysilicon 680 filing the first void 671, and the second contact 682 is formed through the first dielectric layer and at least partially through the doped polysilicon filing the second void 672. In some embodiments, the doped polysilicon 680 filing the first void 671 is disposed between the first contact 681 and the waveguide 660, and the doped polysilicon 680 filling the second void 672 is disposed between the second contact 682 and the waveguide 660.

Figure 7A:
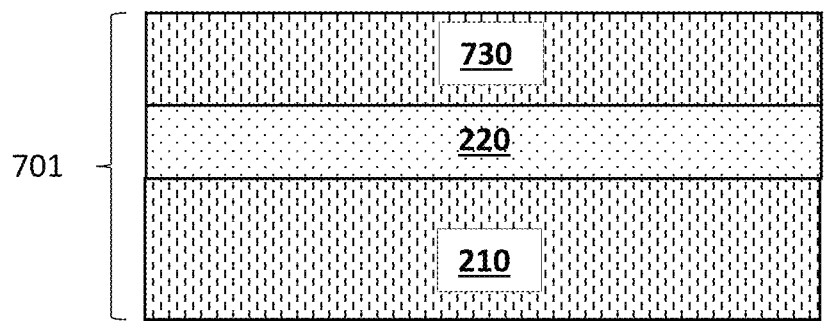
FIGS. 7A-7F are cross-sectional diagrams illustrating epitaxial growth of an active layer having ferroelectric properties on a three-dimensional structure and formation of one or more additional layers over the active layer according to some embodiments.
Figure 7B:
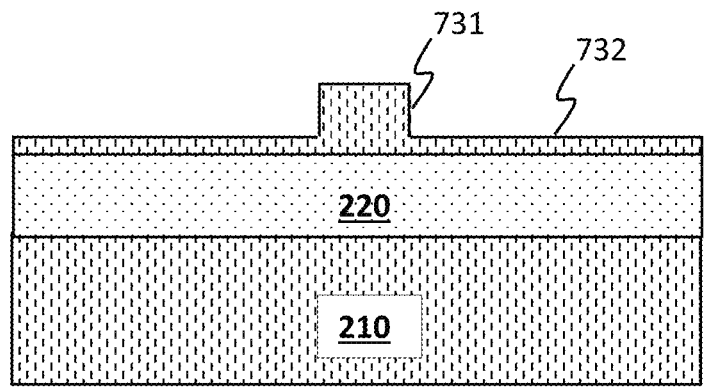
Figure 7C:
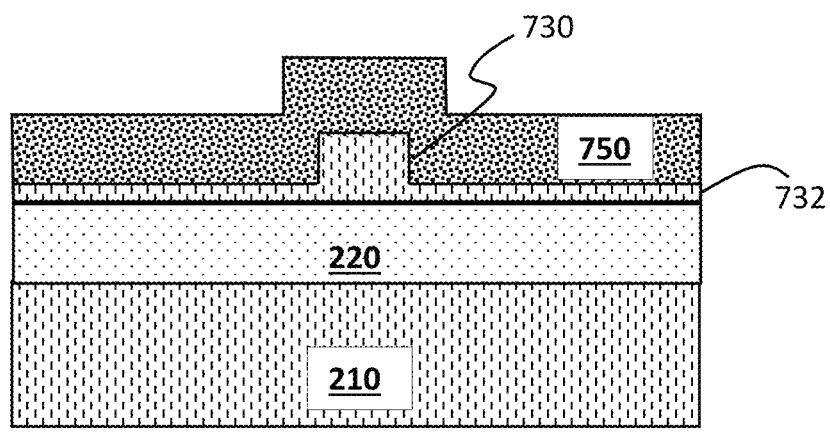
Figure 7D:
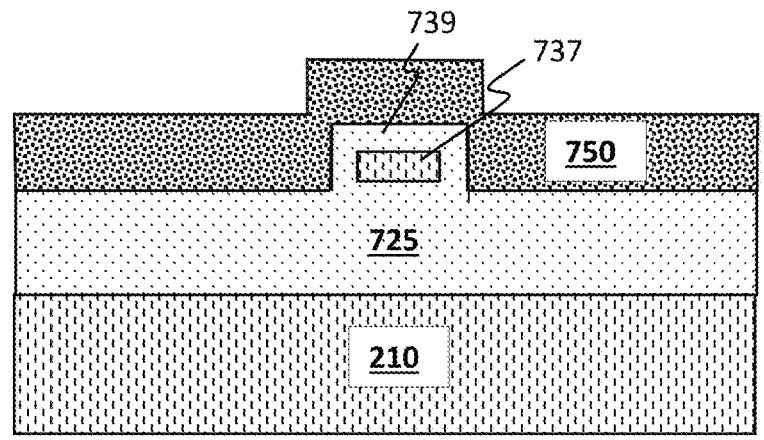

FIGS. 7A-7F are cross-sectional diagrams illustrating epitaxial growth of an active layer having ferroelectric properties on a three-dimensional structure and formation of one or more additional layers over the active layer during fabrication of an electro-optical device 700 according to some embodiments. In some embodiments, instead of, or in addition to, forming a waveguide and cladding over an active layer, the method further comprises, before epitaxially growing an active layer: forming a silicon ridge on a silicon layer. In some embodiments, the silicon ridge can be formed by obtaining an SOI substrate 701 with a thicker (e.g., 200-350 nm thick) silicon layer 730, as shown in FIG. 7A, masking the area on the silicon layer 730 where the silicon ridge waveguide 731 is to be situated, and etching the silicon layer on the SOI substrate using an anisotropic etching (e.g., ME) process to thin down the unmasked portion of the silicon layer to, for example, less than 150 nm, as shown in FIG. 7B. An active layer 750 is then epitaxially grown on the silicon ridge waveguide 731 and the portion 732 of the silicon layer 730 that has thinned down, similarly as the active layer 250 is grown. Thus, as shown in FIG. 7C, a first portion of the active layer 750 is grown on the portion of the thin silicon layer 732 and a second portion of the active layer 750 is epitaxially grown over the silicon ridge. During the oxidation anneal process, as shown in FIG. 7D, the portion 732 of the silicon layer 730 and an outer portion of the silicon ridge adjacent the active layer 750 are converted into silicon dioxide concurrently, resulting in the silicon ridge 737 to be embedded in a silicon dioxide layer 725, which includes the silicon dioxide in layer 220 and the silicon dioxide converted from portions of the silicon layer 730. Thus, an inner portion of the silicon ridge forms a silicon ridge waveguide 737 that is separated from the active layer 750 by a portion 739 of the silicon dioxide layer 725, which reduces interface defects and optical loss.

Figure 7E:
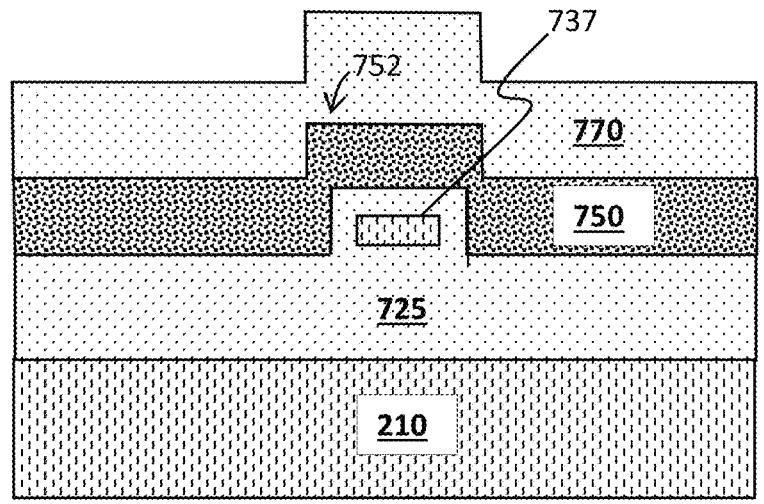
Figure 7F:
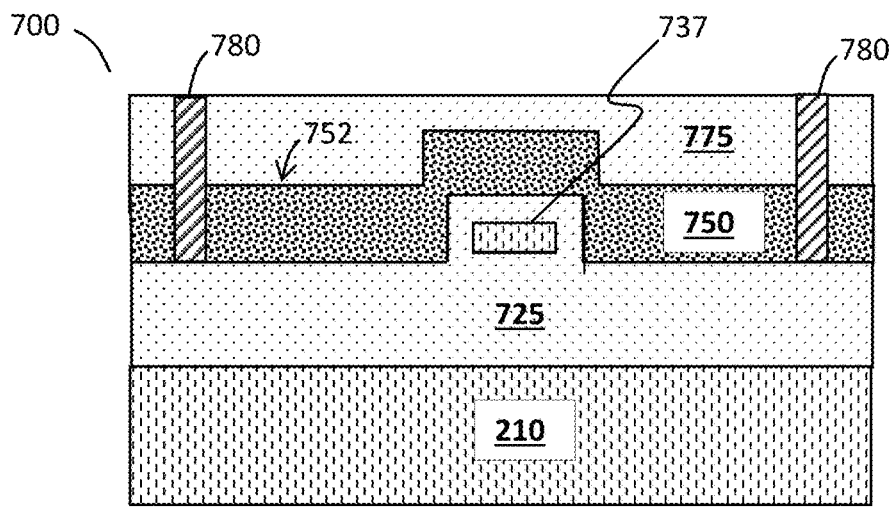

In some embodiments, a dielectric layer 770 (e.g., silicon dioxide) is then formed on the uneven top surface of the active layer 750, as shown in FIG. 7E. The dielectric layer 770 is then planarized to form the cladding layer 775, and first and second contacts 780 to the active layer 750 are formed through the cladding layer 775 and optionally at least partially through the active layer 750, as shown in FIG. 7F. In some embodiments, the first and second contacts 780 are on opposite sides of the waveguide 737 and separated from the waveguide by respective portions of the cladding layer 775. In some embodiments, the first and second contacts 780 abuts a top surface 752 of the active layer 750. In some embodiments, the first and second contacts 780 are partially or all the way through the active layer 750. In some embodiments, the first and second contacts 780 include a metal (e.g., copper, gold, etc.) and facilitate application of an electric field across a portion of the active layer 750 between the first and second contacts 780.

Thus, the method of fabricating an electro-optical device according to some embodiments provides seamless integration of the formation of a complex oxide film and other components of the electro-optical device on a same SOI substrate.

In some embodiments, an electro-optical device can be fabricated on a SOI substrate 200 according to some embodiments. In some embodiments, as shown in FIGS. 3C, 4C, 5C, 6C and 7F, the electro-optical device comprises a silicon dioxide layer 225 on the silicon base substrate 210 of the SOI substrate, and an epitaxially grown active layer 250 having ferroelectric properties over the silicon dioxide layer 225. The silicon dioxide layer 225 includes a first silicon dioxide layer 220 that is part of the SOI substrate 200 and a second silicon dioxide layer 235 adjoining the first silicon dioxide layer 220 and adjacent to the active layer 250. The first silicon dioxide layer 220 and the second silicon dioxide layer 235 form a contiguous silicon dioxide layer 225 adjacent at least a portion of the active layer 250. The second silicon dioxide layer 235 is converted from at least a portion of the silicon layer 230 of the SOI substrate 200. The active layer 250 includes a buffer layer 240 at least partially adjacent to the silicon dioxide layer 225 and a ferroelectric layer 245 epitaxially grown on the buffer layer 240 and separated from the silicon dioxide layer 225 by at least the buffer layer. The electro-optical device further comprises one or more additional layers over the active layer, and first and second contacts to the active layer 250 through at least one of the one or more additional layers. In some embodiments, the contacts may further extend partially or entirely through the active layer 250.

In some embodiments, the buffer layer 240 includes one or more of, for example, Strontium Titanate and/or Magnesium Oxide, and the ferroelectric layer includes one or more of, for example, Barium Titanate, Barium Strontium Titanate, Lead Zirconate Titanate, Lanthanum-doped Lead Zirconium Titanate, Lithium Niobate, Lithium Tantalate, and/or Strontium Barium Niobate. In some embodiments, the buffer layer has a thickness in the range of 3 nm to 30 nm, and the ferroelectric layer has a thickness in the range of 50 nm to 750 nm. In some embodiments, the ferroelectric layer 245 may be a superlattice layer including multiple interleaved layers of different ferroelectric materials, or multiple interleaved layers of one or more ferroelectric materials and one or more non-ferroelectric materials.

In some embodiments, as shown in FIG. 3C, in an electro-optical device 300 according to some embodiments, the one or more additional layers includes a waveguide 360 disposed over the active layer 250, and a cladding 370 for the waveguide 250. The one or more additional layers may further include an optional dielectric buffer layer between the waveguide and the active layer 250. In some embodiments, the cladding includes a dielectric material selected from the group consisting of: silicon dioxide, silicon nitride, silicon oxynitride, silicon oxycarbide, aluminum oxide, and magnesium oxide. The waveguide includes a material (e.g., Si, SiN, MgO, SiC, etched BTO or a ferroelectric material different from the ferroelectric material in the active layer 250, etc.) having an index of refraction greater than that of the cladding layer.

In some embodiments, as shown in FIG. 4C, in an electro-optical device 400 according to some embodiments, the active layer includes a ferroelectric waveguide 455 over and adjoining a lower portion 450 of the ferroelectric layer 250, and the one or more additional layers include a cladding 470 for the ferroelectric waveguide and first and second contacts 480 to the ferroelectric layer 450.

In some embodiments, as shown in FIG. 5C, in an electro-optical device 500 according to some embodiments, the active layer 550 has a trench 552, and the one or more additional layers include a waveguide 565 formed in the trench. In some embodiments, the waveguide includes one or more of silicon, silicon-rich silicon germanium, germanium, silicon carbide, and a ferroelectric material different from the ferroelectric material in the active layer 250, and the one or more additional layers further include a layer of a dielectric material 570 (having an index of refraction less than that of the waveguide) over the waveguide 565 and the active layer 550, and first and second contacts 580 to the active layer 550. For example, the dielectric material includes one or more of silicon dioxide, silicon nitride, silicon oxynitride, silicon oxycarbide, aluminum oxide, and magnesium oxide.

In some embodiments, as shown in FIG. 6C, in an electro-optical device 600 according to some embodiments, the one or more additional layers include: a waveguide 660 over the active layer 250, a dielectric layer 675 over the waveguide 660 and the active layer 250, first and second doped polysilicon regions 680 on opposite sides of the waveguide 660 and separated from the waveguide 660 by respective portions of the dielectric layer 675, and first and second contacts 681/682 coupled to the first and second doped polysilicon regions 680, respectively. In some embodiments, the first contact 681 is coupled to the first doped polysilicon region (e.g., the doped polysilicon filling a first void 671 in the dielectric layer 670, as shown in FIG. 6B), and the second contact 682 is coupled to the second doped polysilicon region (e.g., the doped polysilicon filling a second void 672 in the dielectric layer 670, as shown in FIG. 6B). In some embodiments, the first doped polysilicon region is disposed on the active layer 250 and between the first contact 681 and the waveguide 660, and the second doped polysilicon region is disposed on the active layer 250 and between the second contact 682 and the waveguide 660. In some embodiments, the first and second contacts 681/682 are formed through the dielectric layer 675 and optionally at least partially through the active layer 250. In some embodiments, the waveguide 660 includes silicon nitride, and the dielectric layer includes silicon dioxide.

In some embodiments, as shown in FIG. 7F, in an electro-optical device 700 according to some embodiments, a silicon ridge waveguide 737 is disposed between an active layer 750 and a silicon dioxide layer 725. In some embodiments, the silicon ridge waveguide is embedded in the silicon dioxide layer 725 and separate from the active layer 750 by a portion of the silicon dioxide layer 725. In some embodiments, the active layer 750 has an uneven top surface 752 and a dielectric layer 775 is formed over the uneven surface 752 of the active layer 750. The electro-optical device 700 further includes first and second contacts 780 through the dielectric layer 775 and optionally at least partially through the active layer 750.

In some embodiments, the waveguide shown in any of FIGS. 3C, 4C, 5C, 6C, and 7F has a top surface and sidewalls that can forming an angle with the top surface in the range of, for example, 30-90 degrees, or 45-60 degrees.

Figure 8A:
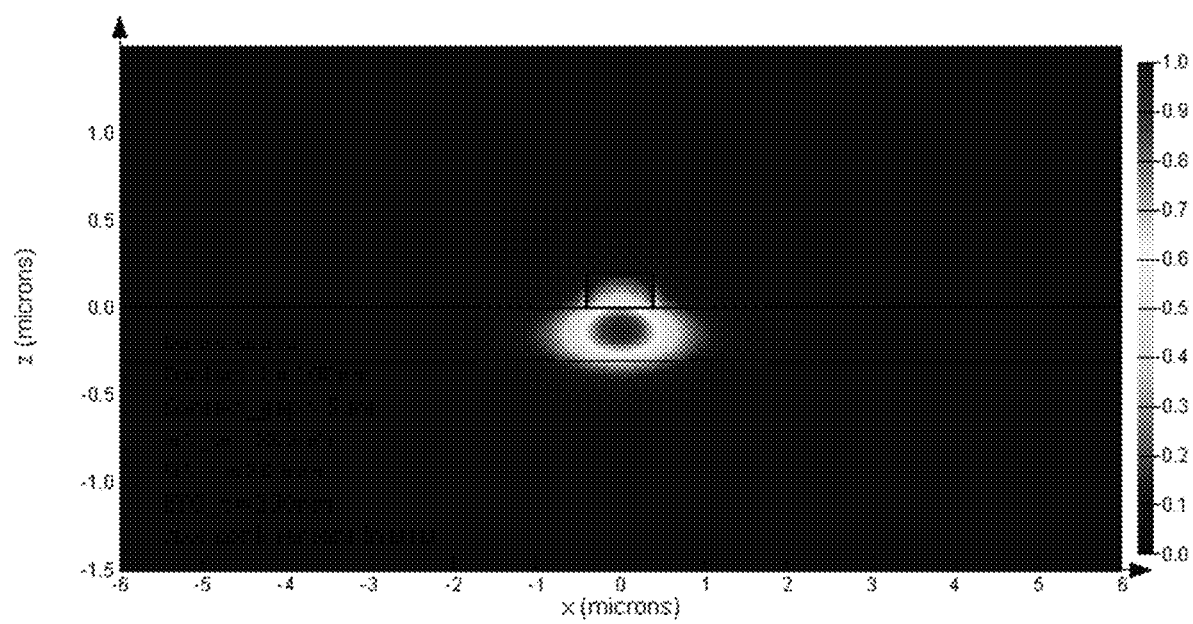
FIGS. 8A-8C are diagrams illustrating modeling results associated with an electro-optical device according to some embodiments.
Figure 8B:
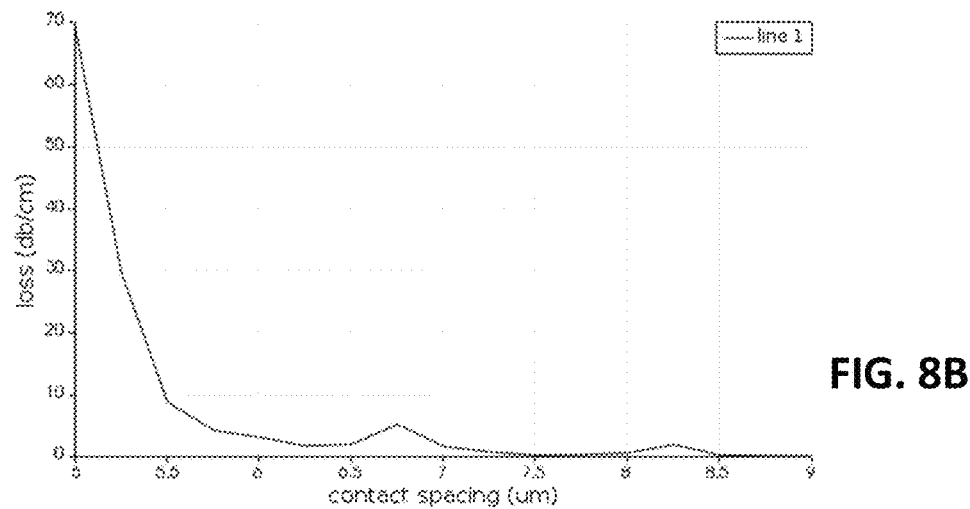
Figure 8C:
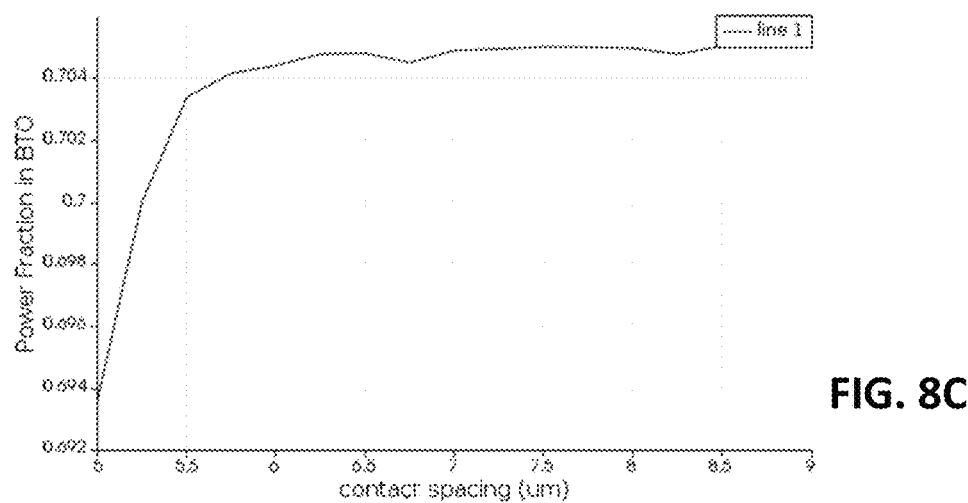

FIGS. 8A-8C are diagrams illustrating modeling results associated with the electro-optical device illustrated in FIG. 3C, showing good WG-BTO overlap (e.g., >70%) and low loss when electrodes are >5.5 um apart. Electrode separation can be reduced considerably if doped poly-Si are used together with the contacts to BTO, resulting in lower carrier concentration, as in the electro-optical device shown in FIG. 6C.

Figure 9A:
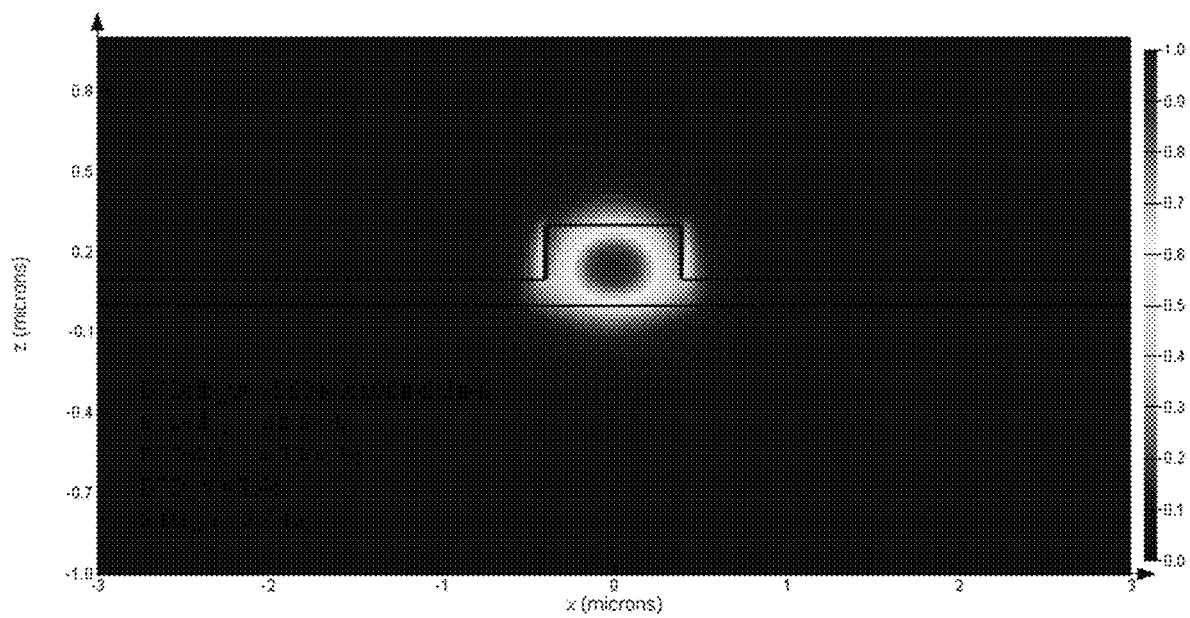
FIGS. 9A-9C are diagrams illustrating modeling results associated with another electro-optical device according to some embodiments.
Figure 9B:
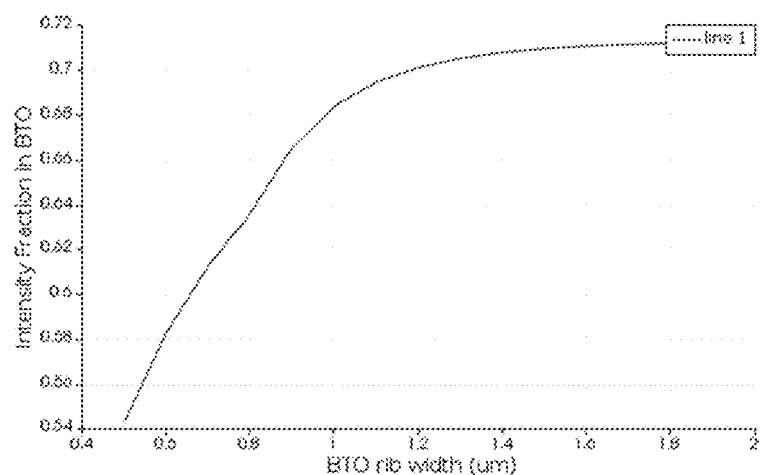
Figure 9C:
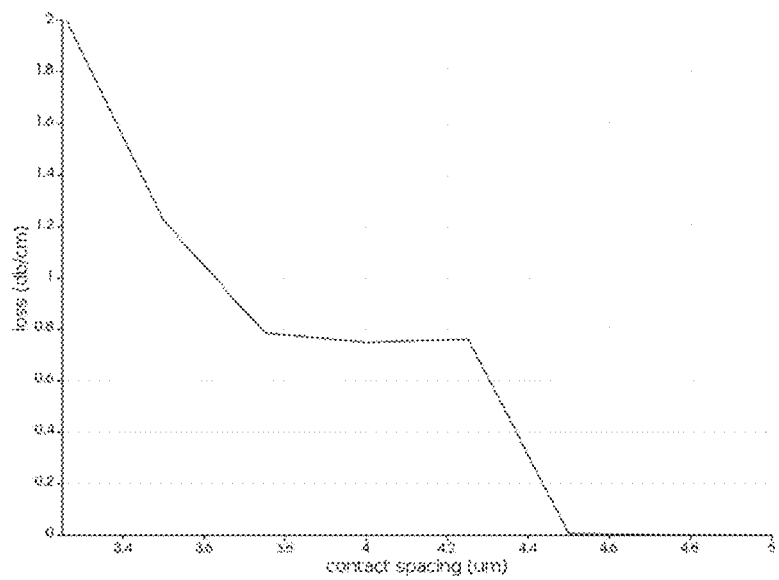

FIGS. 9A-9C are diagrams illustrating modeling results associated with the electro-optical device illustrated in FIG. 4C, showing good WG-BTO overlap (e.g., ~70%) and low loss when electrodes are >4.4 um apart. Again, electrode separation is expected to be reduced considerably if doped poly-Si are used together with the contacts to BTO, resulting in lower carrier concentration, as in the electro-optical device shown in FIG. 6C.

Figure 10A:
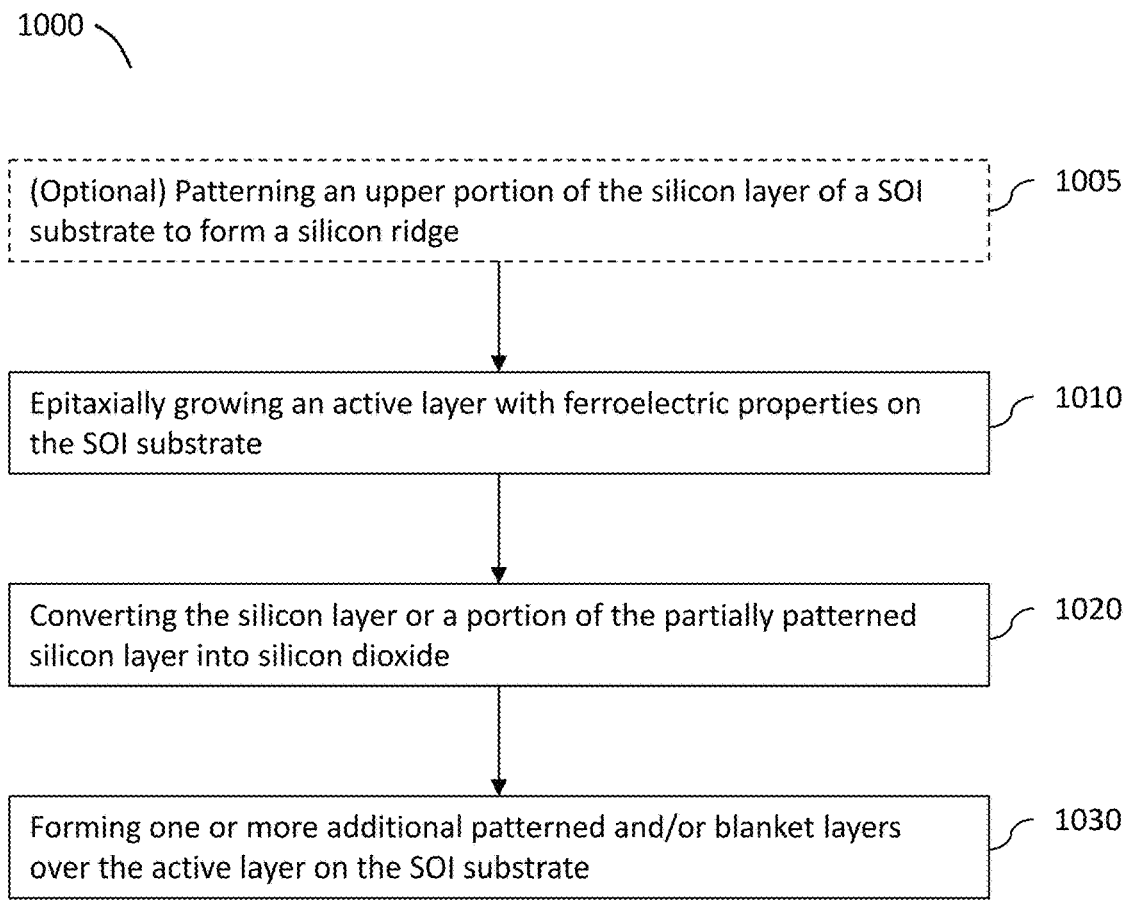
FIGS. 10A-10F are flowcharts illustrating a method of fabricating an electro-optical device according to various embodiments.

FIGS. 10A-10F are flowcharts illustrating a method of fabricating an electro-optical device according to various embodiments. As shown in FIG. 10A, a method 1000 of fabricating an electro-optical device (e.g., electro-optical device 300, 400, 500, 600, or 700) comprises epitaxially growing (1010) an active layer 250/750 with ferroelectric properties on a semiconductor-on-insulator (SOI) substrate 200/701 having a silicon layer 230/730 on a silicon dioxide layer 220 on a silicon base substrate 210, as discussed above with reference to FIGS. 2A-2B and 7A-7C. In some embodiments, the silicon layer 730 is relatively thick (e.g., 200-350 nm thick) compared with common SOI substrates, and method 100 may optionally comprise, before growing (1010) the active layer 250, patterning (1005) an upper portion of the silicon layer 730 to form a silicon ridge 731, as discussed above with reference to FIG. 7B.

Method 1000 further comprises converting (1020) the silicon layer 230 or a portion of the silicon layer 730 into silicon dioxide, as discussed above with reference to FIGS. 2C and 7D. The converted silicon dioxide joins the silicon dioxide layer 220 of the SOI substrate 200/701 to form a contiguous oxide layer 225/725 under the active layer 250/750 that is thicker (e.g., up to 350 nm thicker) than the original silicon dioxide layer 220 of the SOI substrate 200/701. Thus, after the epitaxial growth of the active layer and conversion of the silicon layer into silicon dioxide, the resulting structure includes the single crystal active layer 250/750 on a thick (e.g., 0.8 to 4.3 μm) amorphous silicon dioxide layer 225/725, as shown in FIGS. 2C and 7D.

In some embodiments, method 1000 further comprises forming (1030) one or more additional patterned and/or blanket layers over the active layer 250/750 on the SOI substrate 200/701 after the silicon layer 230 or a portion of the silicon layer 730 is converted into the silicon dioxide, as discussed above with reference to FIGS. 3A to 7F. At least one of the one or more additional layers includes a non-ferroelectric material (e.g., silicon, silicon carbide, silicon germanium, silicon dioxide, silicon nitride, silicon oxynitride, silicon oxycarbide, aluminum oxide, magnesium oxide, etc.).

Figure 10B:
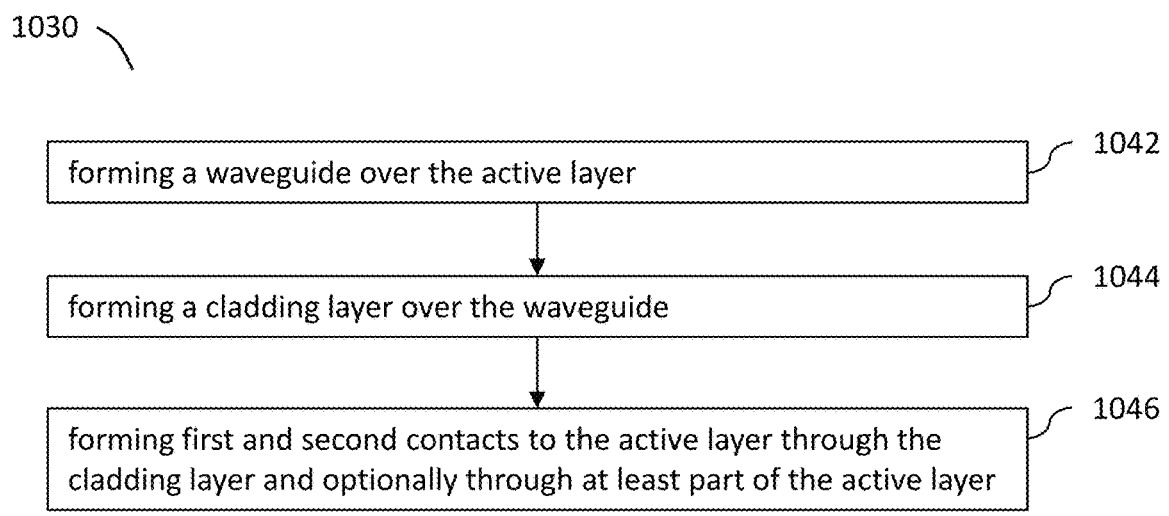

In some embodiments, as shown in FIG. 10B, forming (1030) the one or more additional layers comprises forming (1042) a waveguide 360 (e.g., silicon nitride waveguide) over the active layer 250, and forming (1044) a cladding layer 370 (e.g., silicon dioxide cladding) over the waveguide 360, forming (1046) first and second contacts 380 to the active layer 250 through at least one of the one or more additional layers (e.g., the cladding layer) and optionally through at least part of the active layer 250, as discussed above with reference to FIGS. 3A-3C.

Figure 10C:
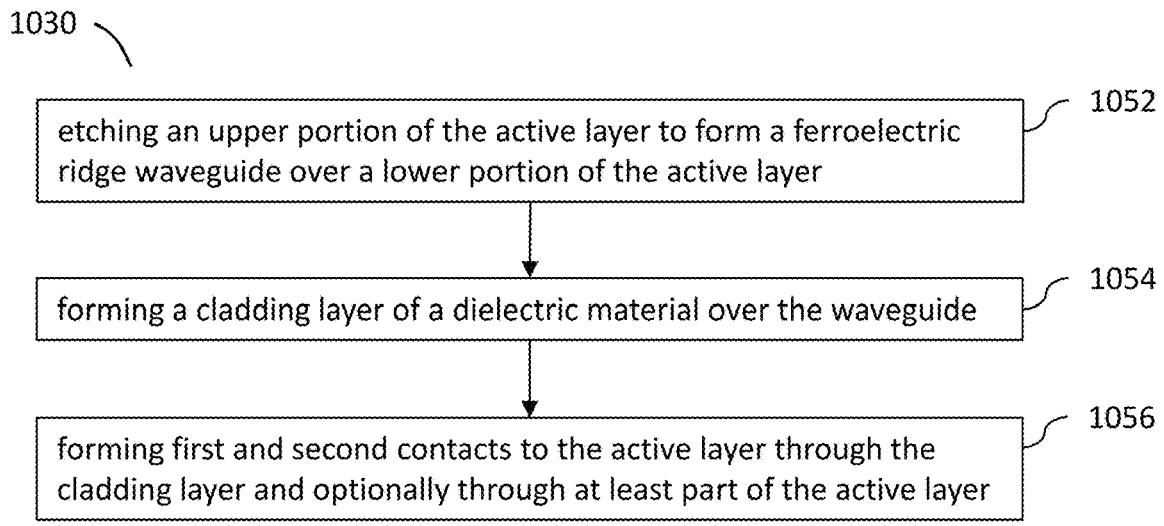

In some embodiments, as shown in FIG. 10C, forming (1030) the one or more additional layers comprises, etching (1052) an upper portion of the active layer 250 to form a ferroelectric ridge waveguide 455 over a lower portion 450 of the active layer 250, forming (1054) a cladding layer 470 of a dielectric material over the waveguide 455, and forming (1056) first and second contacts 480 on opposite sides of the waveguide 455 and separated from the waveguide 455 by respective portions of the cladding layer 470, as discussed above with reference to FIGS. 4A-4C.

Figure 10D:
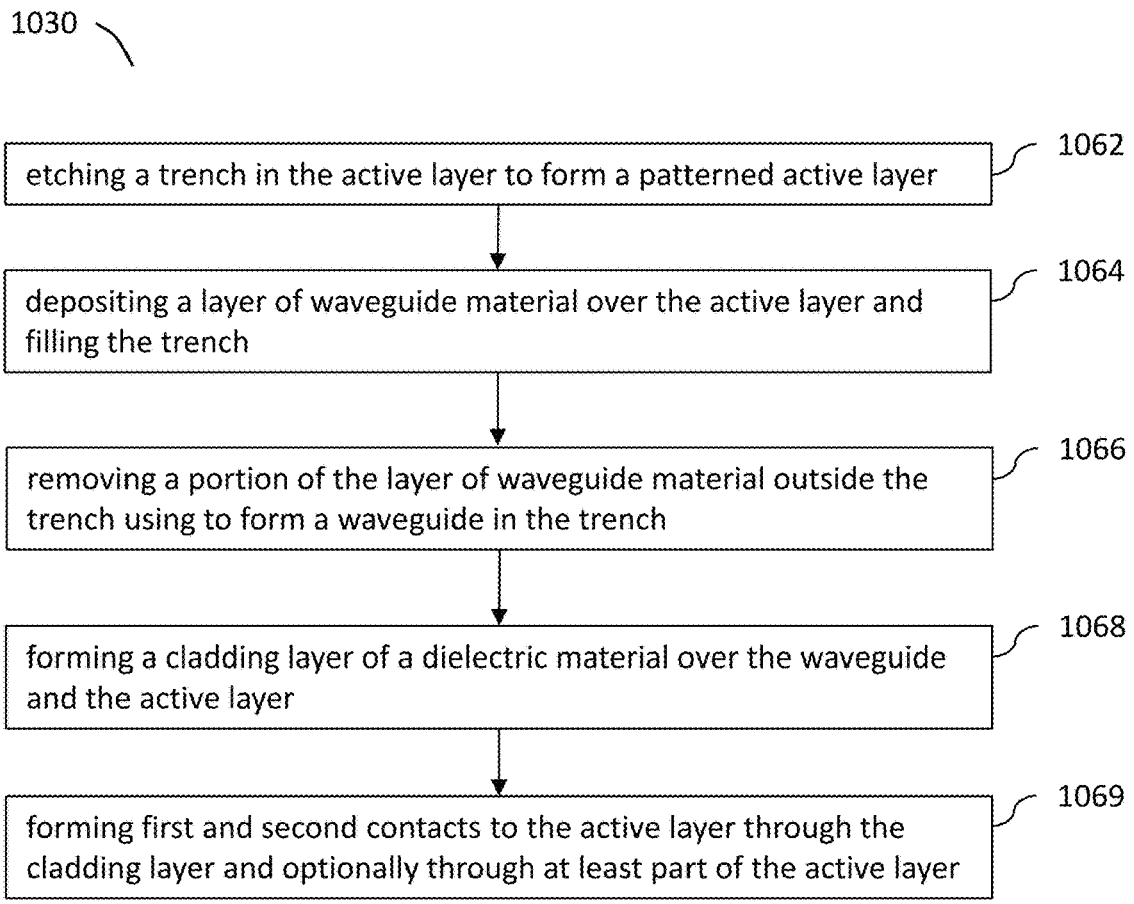

In some embodiments, as shown in FIG. 10D, forming (1030) the one or more additional layers comprises etching (1062) a trench 552 in the active layer 250 to form a patterned active layer 550, depositing (1064) a layer of waveguide material 560 (e.g., silicon, silicon-rich silicon germanium, germanium, silicon carbide, magnesium oxide, a ferroelectric material different from the ferroelectric material in the active layer 250, etc.) over the active layer 550 and filling the trench 552, removing (1066) a portion of the layer of waveguide material 560 outside the trench using, for example, CMP, to form a waveguide 565 in the trench, forming (1068) a cladding layer 570 over the waveguide 565 and the active layer 550, and forming (1069) first and second contacts 580 on opposite sides of the waveguide and separated from the waveguide by respective portions of the cladding layer, as discussed above with reference to FIGS. 5A-5C.

Figure 10E:
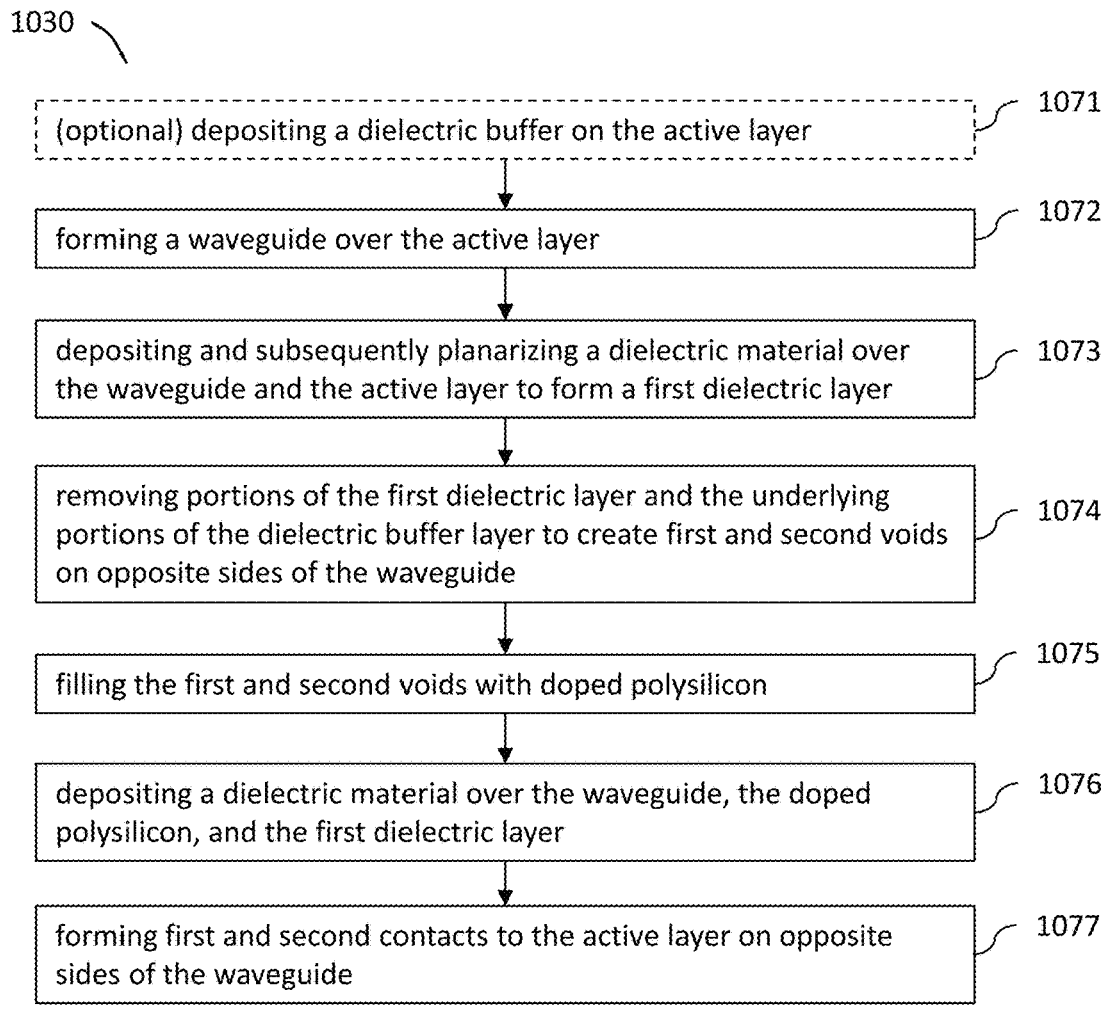

In some embodiments, as shown in FIG. 10E, forming (1030) the one or more additional layers comprises optionally depositing (1071) a dielectric buffer 640 on the active layer 250, forming (1072) a waveguide 660 over the active layer 250 (the waveguide 660 can be separated from the active layer 250 by the optional dielectric buffer layer 640), depositing and subsequently planarizing (1073) a dielectric material (e.g., silicon dioxide) over the waveguide and the active layer 250 to form a first dielectric layer 670 about as thick as the waveguide 660 so a top surface 665 of the resulting structure is substantially planar, removing (1074) portions of the first dielectric layer 670 and the underlying portions of the dielectric buffer layer 640 to create first and second voids 671/672 (e.g., holes, trenches or cavities) on opposite sides of the waveguide 660 using, for example, a patterned RIE process, filling (1075) the first and second voids 671/672 with doped polysilicon 680, which can be done by, for example, blanket deposition of the doped polysilicon and selective removal of the polysilicon outside of the first and second voids 671/672 using, for example, CMP, depositing (1076) a dielectric material (e.g., silicon dioxide) over the waveguide 660, the doped polysilicon 680 in the first and second voids, and the first dielectric layer 670, resulting in a thicker cladding layer 675 that includes the first dielectric layer 670 and newly deposited dielectric material, and forming (1077) first and second contacts 681/682 on opposite sides of the waveguide 660 and separated from the waveguide 660 by respective portions of the cladding layer 675, as discussed above with reference to FIGS. 6A-6C.

In some embodiments, the active layer 750 is epitaxially grown on the silicon layer 730 that has been partially patterned. Thus, as shown in FIG. 7C, a first portion of the active layer 750 is grown on the portion of the thin silicon layer 732 and a second portion of the active layer 750 is epitaxially grown over a silicon ridge. During the oxidation anneal process 1020, as shown in FIG. 7D, the portion 732 of the silicon layer 730 and an outer portion of the silicon ridge adjacent the active layer 750 are converted into silicon dioxide concurrently, resulting in the silicon ridge 737 to be embedded in a silicon dioxide layer 725, which includes the silicon dioxide in layer 220 and the silicon dioxide converted from portions of the silicon layer 730.

Figure 10F:
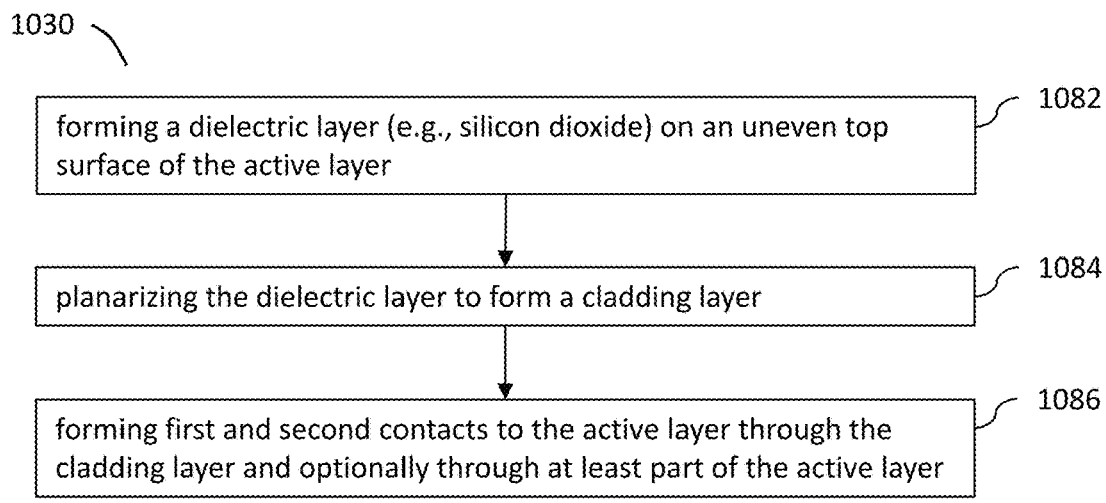

In some embodiments, as shown in FIG. 10F, forming (1030) the one or more additional layers comprises forming (1082) a dielectric layer 770 (e.g., silicon dioxide) on the uneven top surface 752 of the active layer 750, planarizing (1084) the dielectric layer 770 to form a cladding layer 775, and forming (1086) first and second contacts 780 to the active layer 750 through the cladding layer 775 and optionally at least partially through the active layer 750, as discussed above with reference to FIGS. 7E-7F.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An electro-optical device, comprising:
   a silicon dioxide layer;
   an active layer having ferroelectric properties, including a buffer layer at least partially adjacent to the silicon dioxide layer and a ferroelectric layer on the buffer layer and separated from the silicon dioxide layer by at least the buffer layer;
   one or more additional layers over the active layer; and
   first and second contacts to the active layer through at least a portion of the active layer and through at least one of the one or more additional layers, wherein the first and second contacts are configured to facilitate application of an electric field across at least the portion of the active layer between the first and the second contacts to the active layer.

2. The electro-optical device of claim 1, wherein:
   the silicon dioxide layer includes a first silicon dioxide layer that is part of a silicon-on-insulator (SOI) substrate and a second silicon dioxide layer adjoining the first silicon dioxide layer and adjoining the buffer layer; and
   the second silicon dioxide layer is converted from at least a portion of a silicon layer of the SOI substrate.

3. The electro-optical device of claim 2, wherein the first silicon dioxide layer and the second silicon dioxide layer form a contiguous oxide layer.

4. The electro-optical device of claim 2, wherein at least a portion of the buffer layer is epitaxially grown on the silicon layer.

5. The electro-optical device of claim 2, further comprising a substrate layer of the SOI substrate under the silicon dioxide layer.

6. The electro-optical device of claim 1, wherein the buffer layer includes Strontium Titanate ($SrTiO_3$), and the ferroelectric layer includes one or more of Barium Titanate ($BaTiO_3$), Barium Strontium Titanate ($BaSrTiO_3$), Lead Zirconate Titanate ($Pb[Zr_xTi_{1-x}]O_3$), Lanthanum-doped Lead Zirconium Titanate ($Pb_yLa_{1-y}[Zr_xTi_{1-x}]_zO_3$), and Strontium Barium Niobate ($Sr_xBa_{1-x})Nb_2O_6$ or SBN).

7. The electro-optical device of claim 1, wherein the one or more additional layers includes a waveguide disposed over the active layer, and a cladding for the waveguide.

8. The electro-optical device of claim 7, wherein the one or more additional layers further includes a dielectric layer between the waveguide and the active layer.

9. The electro-optical device of claim 7, wherein the cladding includes a dielectric material selected from the group consisting of: silicon dioxide, silicon nitride, silicon oxynitride, silicon oxycarbide, aluminum oxide, and magnesium oxide.

10. The electro-optical device of claim 1, wherein the active layer includes a ferroelectric waveguide over and adjoining a lower portion of the ferroelectric layer, and wherein the one or more additional layers include a cladding for the ferroelectric waveguide.

11. The electro-optical device of claim 1, further comprising a waveguide between the active layer and the silicon dioxide layer.

12. The electro-optical device of claim 11, wherein the waveguide includes silicon and is separate from the active layer by a third oxide layer.

13. The electro-optical device of claim 11, wherein the active layer has an uneven top surface adjacent one of the one or more additional layers.

14. The electro-optical device of claim 1, wherein the one or more additional layers include a layer of a dielectric material selected from the group consisting of: silicon dioxide, silicon nitride, silicon oxynitride, silicon oxycarbide, aluminum oxide, and magnesium oxide.

15. The electro-optical device of claim 1, wherein the active layer has a trench, and the one or more additional layers include a waveguide formed in the trench.

16. The electro-optical device of claim 15, wherein the waveguide includes one or more of silicon, silicon-rich silicon germanium, germanium, or silicon carbide, and the one or more additional layers further include a layer of a dielectric material over the waveguide and the active layer, the dielectric material being selected from the group consisting of: silicon dioxide, silicon nitride, silicon oxynitride, silicon oxycarbide, aluminum oxide, and magnesium oxide.

17. The electro-optical device of claim 1, wherein the one or more additional layers include:
   a waveguide over the active layer; and
   a dielectric layer over the waveguide and the active layer; and
   first and second doped polysilicon regions on opposite sides of the waveguide and separated from the waveguide by portions of the dielectric layer;
   wherein the first contact is coupled to the first doped polysilicon region, and the second contact is coupled to the second doped polysilicon region.

18. The electro-optical device of claim 17, wherein the first doped polysilicon region is disposed on the active layer and between the first contact and the waveguide, and the second doped polysilicon region is disposed on the active layer and between the second contact and the waveguide.

19. The electro-optical device of claim 17, wherein the first and second contacts are formed at least partially through the dielectric layer.

20. The electro-optical device of claim 17, wherein the waveguide includes silicon nitride, and the dielectric layer includes silicon dioxide.

21. The electro-optical device of claim 17, wherein the waveguide has a top surface and a sloped sidewall forming an angle of 30-60 degrees with the top surface.

* * * * *